(12) United States Patent
Sorgenfrei et al.

(10) Patent No.: US 12,436,280 B2
(45) Date of Patent: Oct. 7, 2025

(54) MAINTAINING CONSISTENT PHOTODETECTOR SENSITIVITY IN AN OPTICAL MEASUREMENT SYSTEM

(71) Applicant: HI LLC, Los Angeles, CA (US)

(72) Inventors: Sebastian Sorgenfrei, Playa Vista, CA (US); Rong Jin, Acton, MA (US); Ryan Field, Culver City, CA (US); Jacob Dahle, Arlington, MA (US); Bruno Do Valle, Brighton, MA (US)

(73) Assignee: HI LLC, Culver City, CA (US)

( * ) Notice: Subject to any disclaimer, the term of this patent is extended or adjusted under 35 U.S.C. 154(b) by 1098 days.

(21) Appl. No.: 17/390,624

(22) Filed: Jul. 30, 2021

(65) Prior Publication Data
US 2022/0050198 A1 Feb. 17, 2022

Related U.S. Application Data

(60) Provisional application No. 63/196,926, filed on Jun. 4, 2021, provisional application No. 63/064,249, filed on Aug. 11, 2020.

(51) Int. Cl.
*G01S 17/04* (2020.01)
*A61B 5/00* (2006.01)
(Continued)

(52) U.S. Cl.
CPC ............ *G01S 17/04* (2020.01); *G01S 7/4813* (2013.01); *G01S 7/4861* (2013.01); *H03M 1/12* (2013.01);
(Continued)

(58) Field of Classification Search
CPC ...... G01S 17/04; G01S 7/4813; G01S 7/4861; G01S 7/4815; G01S 17/88; G01S 7/4863;
(Continued)

(56) References Cited

U.S. PATENT DOCUMENTS

| 4,321,930 A | 3/1982 | Jobsis et al. |
| 5,218,962 A | 6/1993 | Mannheimer et al. |

(Continued)

FOREIGN PATENT DOCUMENTS

| JP | 2012125370 A | 1/2015 |
| WO | 2005050156 A2 | 6/2005 |

(Continued)

OTHER PUBLICATIONS

International Search Report and Written Opinion received in International Application No. PCT/US2021/044039 on Nov. 16, 2021.
(Continued)

*Primary Examiner* — Seung C Sohn
(74) *Attorney, Agent, or Firm* — ALG Intellectual Property, LLC

(57) ABSTRACT

An illustrative optical measurement system includes a light source configured to emit a light pulse directed at a target. The optical measurement system further includes a plurality of photodetectors configured to operate in accordance with an input bias voltage. The optical measurement system further includes a control circuit configured to identify a photodetector subset included in the plurality of photodetectors and that detects, while the input bias voltage has a first value, photons of the light pulse after the light pulse is scattered by the target. The control circuit is further configured to determine, based on the identifying of the photodetector subset, an overvoltage associated with the photodetector subset. The control circuit is further configured to update, based on the overvoltage, the input bias voltage for the plurality of photodetectors to have a second value.

18 Claims, 23 Drawing Sheets

(51) Int. Cl.
  *G01S 7/481* (2006.01)
  *G01S 7/4861* (2020.01)
  *H03M 1/12* (2006.01)
  *H10F 77/00* (2025.01)

(52) U.S. Cl.
  CPC .......... *H10F 77/959* (2025.01); *A61B 5/6803* (2013.01); *A61B 5/6868* (2013.01)

(58) Field of Classification Search
  CPC ........ G01S 17/89; H03M 1/12; H10F 77/959; A61B 5/6803; A61B 5/6868; A61B 2562/0238; A61B 2576/026; A61B 5/4064; A61B 5/0059; G01J 1/0252; G01J 2001/442; G01J 1/44
  See application file for complete search history.

(56) References Cited

U.S. PATENT DOCUMENTS

| | | |
|---|---|---|
| 5,853,370 A | 12/1998 | Chance et al. |
| 5,924,982 A | 7/1999 | Chin |
| 6,195,580 B1 | 2/2001 | Grable |
| 6,240,309 B1 | 5/2001 | Yamashita et al. |
| 6,384,663 B2 | 5/2002 | Cova et al. |
| 6,542,763 B1 | 4/2003 | Yamashita et al. |
| 6,618,614 B1 | 9/2003 | Chance |
| 6,640,133 B2 | 10/2003 | Yamashita |
| 6,683,294 B1 | 1/2004 | Herbert et al. |
| 7,356,365 B2 | 4/2008 | Schurman |
| 7,547,872 B2 | 6/2009 | Niclass et al. |
| 7,774,047 B2 | 8/2010 | Yamashita et al. |
| 7,888,973 B1 | 2/2011 | Rezzi et al. |
| 8,026,471 B2 | 9/2011 | Itzler |
| 8,078,250 B2 | 12/2011 | Chen et al. |
| 8,082,015 B2 | 12/2011 | Yodh et al. |
| 8,269,563 B2 | 9/2012 | Ballantyne |
| 8,518,029 B2 | 8/2013 | Birmingham et al. |
| 8,633,431 B2 | 1/2014 | Kim |
| 8,817,257 B2 | 8/2014 | Herve |
| 9,058,081 B2 | 6/2015 | Baxter |
| 9,076,707 B2 | 7/2015 | Harmon |
| 9,131,861 B2 | 9/2015 | Ince et al. |
| 9,316,735 B2 | 4/2016 | Baxter |
| 9,401,448 B2 | 7/2016 | Bienfang et al. |
| 9,419,635 B2 | 8/2016 | Kumar et al. |
| 9,442,201 B2 | 9/2016 | Schmand et al. |
| 9,529,079 B1 | 12/2016 | Droz |
| 9,554,738 B1 | 1/2017 | Gulati et al. |
| 9,574,936 B2 | 2/2017 | Heinonen |
| 9,946,344 B2 | 4/2018 | Ayaz et al. |
| D817,553 S | 5/2018 | Aaskov et al. |
| 9,983,670 B2 | 5/2018 | Coleman et al. |
| D825,112 S | 8/2018 | Saez |
| 10,154,815 B2 | 12/2018 | Al-Ali et al. |
| 10,158,038 B1 | 12/2018 | Do Valle et al. |
| 10,340,408 B1 | 7/2019 | Katnani |
| 10,424,683 B1 | 9/2019 | Do Valle |
| 10,515,993 B2 | 12/2019 | Field et al. |
| 10,541,660 B2 | 1/2020 | Mckisson |
| 10,695,167 B2 | 6/2020 | Heugten et al. |
| 10,697,829 B2 | 6/2020 | Delic |
| 10,772,561 B2 | 9/2020 | Donaldson |
| 10,809,796 B2 | 10/2020 | Armstrong-Muntner |
| 10,912,504 B2 | 2/2021 | Nakaji |
| 11,006,876 B2 | 5/2021 | Johnson |
| 11,006,878 B2 | 5/2021 | Johnson |
| 11,096,620 B1 | 8/2021 | Seidman |
| 11,137,283 B2 | 10/2021 | Balamurugan |
| 11,213,245 B2 | 1/2022 | Horstmeyer et al. |
| 11,857,348 B2 | 1/2024 | Field et al. |
| 11,903,676 B2 | 2/2024 | Sorgenfrei et al. |
| 11,950,879 B2 | 4/2024 | Field et al. |
| 2002/0033454 A1 | 3/2002 | Cheng et al. |
| 2004/0064052 A1 | 4/2004 | Chance et al. |
| 2005/0059869 A1 | 3/2005 | Scharf et al. |
| 2007/0083097 A1 | 4/2007 | Fujiwara |
| 2008/0021341 A1 | 1/2008 | Harris et al. |
| 2009/0012402 A1 | 1/2009 | Mintz |
| 2009/0054789 A1 | 2/2009 | Kiguchi et al. |
| 2010/0007413 A1 | 1/2010 | Herleikson et al. |
| 2011/0208675 A1 | 8/2011 | Shoureshi et al. |
| 2012/0083673 A1 | 4/2012 | Al-Ali et al. |
| 2013/0153754 A1 | 6/2013 | Drader et al. |
| 2013/0300838 A1 | 11/2013 | Borowski et al. |
| 2013/0334411 A1 | 12/2013 | Brunel |
| 2013/0342835 A1 | 12/2013 | Blacksberg |
| 2014/0046152 A1 | 2/2014 | Bechtel et al. |
| 2014/0191115 A1 | 7/2014 | Webster et al. |
| 2014/0217264 A1 | 8/2014 | Shepard |
| 2014/0275891 A1 | 9/2014 | Muehlemann et al. |
| 2015/0011848 A1 | 1/2015 | Ruchti et al. |
| 2015/0038811 A1 | 2/2015 | Asaka |
| 2015/0038812 A1 | 2/2015 | Ayaz et al. |
| 2015/0041625 A1 | 2/2015 | Dutton |
| 2015/0054111 A1 | 2/2015 | Niclass et al. |
| 2015/0077279 A1 | 3/2015 | Song |
| 2015/0150505 A1 | 6/2015 | Kaskoun et al. |
| 2015/0157262 A1 | 6/2015 | Schuessler |
| 2015/0327777 A1 | 11/2015 | Kostic et al. |
| 2015/0355019 A1 | 12/2015 | Nouri et al. |
| 2015/0364635 A1 | 12/2015 | Bodlovic et al. |
| 2016/0057369 A1 | 2/2016 | Wolfe et al. |
| 2016/0247301 A1 | 8/2016 | Fang et al. |
| 2016/0349368 A1 | 12/2016 | Stutz et al. |
| 2017/0030769 A1 | 2/2017 | Clemens et al. |
| 2017/0031009 A1* | 2/2017 | Davidovic ............ G01S 7/4865 |
| 2017/0052065 A1 | 2/2017 | Sharma et al. |
| 2017/0172447 A1 | 6/2017 | Mitra et al. |
| 2017/0176596 A1 | 6/2017 | Shpunt et al. |
| 2017/0179173 A1 | 6/2017 | Mandai et al. |
| 2017/0202518 A1 | 7/2017 | Furman et al. |
| 2017/0281086 A1 | 10/2017 | Donaldson |
| 2017/0338969 A1 | 11/2017 | Paul et al. |
| 2017/0343384 A1 | 11/2017 | Nakazato et al. |
| 2017/0363467 A1 | 12/2017 | Clemens et al. |
| 2017/0367650 A1 | 12/2017 | Wallois |
| 2018/0014741 A1 | 1/2018 | Chou |
| 2018/0027196 A1 | 1/2018 | Yang et al. |
| 2018/0039053 A1 | 2/2018 | Kremer et al. |
| 2018/0070830 A1 | 3/2018 | Sutin et al. |
| 2018/0070831 A1 | 3/2018 | Sutin et al. |
| 2018/0089848 A1 | 3/2018 | Yang et al. |
| 2018/0090536 A1 | 3/2018 | Mandai et al. |
| 2018/0180473 A1 | 6/2018 | Clemens et al. |
| 2018/0192931 A1 | 7/2018 | Linden et al. |
| 2018/0299552 A1 | 10/2018 | Shu |
| 2019/0025406 A1 | 1/2019 | Krelboim et al. |
| 2019/0113385 A1 | 4/2019 | Fukuchi |
| 2019/0175068 A1 | 6/2019 | Everdell |
| 2019/0239753 A1 | 8/2019 | Wentz |
| 2019/0343395 A1 | 11/2019 | Cussac et al. |
| 2019/0355861 A1* | 11/2019 | Katnani ................. H04N 25/76 |
| 2019/0363210 A1 | 11/2019 | Do Valle |
| 2019/0388018 A1 | 12/2019 | Horstmeyer |
| 2020/0044098 A1* | 2/2020 | Azuma ................... G01S 7/486 |
| 2020/0057146 A1 | 2/2020 | Steinkogler et al. |
| 2020/0060542 A1 | 2/2020 | Alford |
| 2020/0116838 A1 | 4/2020 | Erdogan |
| 2020/0196932 A1 | 6/2020 | Johnson |
| 2020/0253479 A1 | 8/2020 | Nurmikko |
| 2020/0315510 A1 | 10/2020 | Johnson |
| 2020/0337624 A1 | 10/2020 | Johnson |
| 2020/0379095 A1 | 12/2020 | Kappel et al. |
| 2020/0390358 A1 | 12/2020 | Johnson |
| 2021/0186138 A1 | 6/2021 | Bartels et al. |
| 2021/0223098 A1 | 7/2021 | Ledvina et al. |
| 2021/0290066 A1* | 9/2021 | Field .................... A61B 5/6803 |

FOREIGN PATENT DOCUMENTS

| | | |
|---|---|---|
| WO | 2006041997 A2 | 4/2006 |
| WO | 2007048039 A2 | 4/2007 |
| WO | 2018033751 | 2/2018 |

(56) References Cited

FOREIGN PATENT DOCUMENTS

OTHER PUBLICATIONS

"What are the advantages of multiplexing," Blog, FiberWDM, Mar. 28, 2023. Retrieved on May 9, 2014 from https://www.fiberwdm.com/blog/what-are-the-advantages-of-multiplexing_b101.
Blair, Seraphine. "Multiplexing in modern communication: what it is & advantages," Blog, JAK Electronics, Mar. 12, 2024. Retrieved on May 9, 2024 from https://www.jakelectronics.com/blog/multiplexing.
Nandalal, et al., "Multiplexing," IntechOpen, Sep. 4, 2019. Retrieved on May 9, 2014 from https://www.jakelectronics.com/blog/multiplexing.
Alayed, et al., "Characterization of a Time-Resolved Diffuse Optical Spectroscopy Prototype Using Low-Cost, Compact Single Photon Avalanche Detectors for Tissue Optics Applications", Sensors 2018, 18, 3680; doi:10.3390/s18113680.
Ban, et al., "Kernel Flow: a high channel count scalable TD-fNIRS system", https://www.spiedigitallibrary.org/conference-proceedings-of-spie Proc. of SPIE vol. 11663, 116630B CCC code: 1605-7422/21/$21 doi: 10.1117/12.2582888.
Contini, et al., "Photon migration through a turbid slab described by a model based on diffusion approximation. I. Theory", Appl. Opt. 36(19), 4587 (1997).
Di Sieno, et al., "Probe-hosted large area silicon photomultiplier and high-throughput timing electronics for enhanced performance time-domain functional near-infrared spectroscopy", Biomed. Opt. Express 11(11), 6389 (2020).
Fishburn, et al., "Temporal Derivative Distribution Repair (TDDR): A motion correction method for fNIRS", Neuroimage. Jan. 1, 2019; 184: 171-179. doi:10.1016/j.neuroimage.2018.09.025.
Huppert, et al., "HomER: a review of time-series analysis methods for near-infrared spectroscopy of the brain", Appl. Opt. 48(10), D280 (2009).
Kienle, et al., "Improved solutions of the steady-state and the time-resolved diffusion equations for reflectance from a semi-infinite turbid medium", J. Opt. Soc. Am. A 14(1), 246 (1997).
Konugolu, et al., "Broadband (600-1350 nm) Time-Resolved Diffuse Optical Spectrometer for Clinical Use", IEEE Journal of Selected Topics in Quantum Electronics, vol. 22, No. 3, May/Jun. 2016.
Lacerenza, et al., "Wearable and wireless time-domain near-infrared spectroscopy system for brain and muscle hemodynamic monitoring", Biomed. Opt. Express 11(10), 5934 (2020).
Lange, et al., "Clinical Brain Monitoring with Time Domain NIRS: A Review and Future Perspectives", Applied Sciences 9(8), 1612 (2019).
Lange, et al., "Maestros: A Multiwavelength Time-Domain NIRS System to Monitor Changes in Oxygenation and Oxidation State of Cytochrome-C-Oxidase", IEEE J. Select. Topics Quantum Electron. 25(1), 1-12 (2019).
Martelli, et al., "Optimal estimation reconstruction of the optical properties of a two-layered tissue phantom from time-resolved single-distance measurements", Journal of Biomedical Optics 20(11), 115001 (Nov. 2015).
Mora, et al., "Fast silicon photomultiplier improves signal harvesting and reduces complexity in time-domain diffuse optics", Opt. Express 23(11), 13937 (2015).
Pifferi, et al., "Performance assessment of photon migration instruments: the MEDPHOT protocol", Applied Optics, 44(11), 2104-2114.
Prahl, et al., "Optical Absorption of Hemoglobin", http://omlc.ogi.edu/spectra/hemoglobin/index.html, as accessed Aug. 17, 2021.
Zucchelli, et al., "Method for the discrimination of superficial and deep absorption variations by time domain fNIRS", 2013 OSA Dec. 1, 2013 | vol. 4, No. 12 | DOI:10.1364/BOE.4.002893 | Biomedical Optics Express 2893.
Renna, et al., "Eight-Wavelength, Dual Detection Channel Instrument for Near-Infrared Time-Resolved Diffuse Optical Spectroscopy", IEEE J. Select. Topics Quantum Electron. 25(1), 1-11 (2019).
Torricelli, et al., "Time domain functional NIRS imaging for human brain mapping", NeuroImage 85, 28-50 (2014).
Wabnitz, et al., "Depth-selective data analysis for time-domain fNIRS: moments vs. time windows", Biomed. Opt. Express 11(8), 4224 (2020).
Wabnitz, et al., "Performance assessment of time-domain optical brain imagers, part 1: basic instrumental performance protocol", Journal of Biomedical Optics 19(8), 086010 (Aug. 2014).
Wabnitz, et al., "Performance assessment of time-domain optical brain imagers, part 2: nEUROPt protocol", Journal of Biomedical Optics 19(8), 086012 (Aug. 2014).
Wojtkiewicz, et al., "Self-calibrating time-resolved near infrared spectroscopy", Biomed. Opt. Express 10(5), 2657 (2019).

* cited by examiner ic MAINTAINING CONSISTENT
PHOTODETECTOR SENSITIVITY IN AN
OPTICAL MEASUREMENT SYSTEM

RELATED APPLICATIONS

The present application claims priority under 35 U.S.C. § 119(e) to U.S. Provisional Patent Application No. 63/196,926, filed on Jun. 4, 2021, and to U.S. Provisional Patent Application No. 63/064,249, filed on Aug. 11, 2020. These applications are incorporated herein by reference in their respective entireties.

BACKGROUND INFORMATION

An optical measurement device may detect blood oxygenation levels and/or blood volume levels by measuring the change in shape of laser pulses after they have passed through target tissue, e.g., brain, muscle, finger, etc. The shape of laser pulses may include a temporal shape, as represented for example by a histogram generated by a time-to-digital converter (TDC) coupled to an output of a photodetector. A photodetector capable of detecting a single photon (i.e., a single particle of optical energy) is an example of a non-invasive detector that can be used in an optical measurement system to detect blood oxygenation levels and/or blood volume levels. An exemplary photodetector is implemented by a semiconductor-based single-photon avalanche diode (SPAD), which is capable of capturing individual photons with very high time-of-arrival resolution (a few tens of picoseconds).

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION

Figure 1:
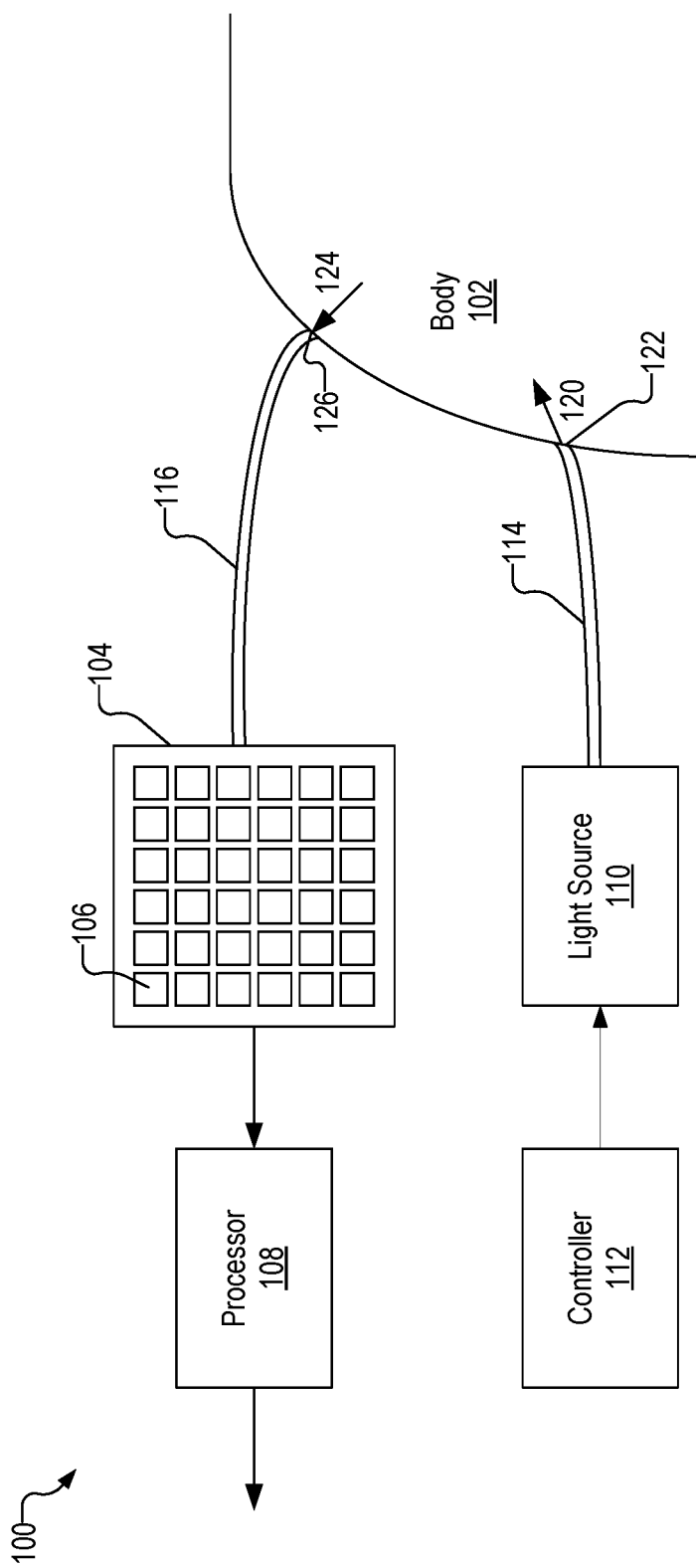
FIG. 1 shows an exemplary optical measurement system.

An optical measurement system as described herein may include a plurality of photodetectors each configured to detect photons of light after the light is scattered by a target (e.g., a brain of a user). The sensitivity of the photodetectors may vary based on temperature. This is because sensitivity of a photodetector is at least in part dependent on an overvoltage for the photodetector, where the overvoltage refers to a difference between a bias voltage used to arm the photodetector and a breakdown voltage of the photodetector. As described herein, the breakdown voltage of a photodetector varies with temperature, which in turn can cause the overvoltage (and hence, the sensitivity) of the photodetector to also vary. This photodetector sensitivity variation may skew or otherwise negatively affect measurements performed by the optical measurement system.

The systems, circuits, and methods described herein may be configured to compensate for such photodetector sensitivity variation by outputting a bias voltage based on a measured overvoltage. For example, an optical measurement system may include a light source configured to emit a light pulse directed at a target. The optical measurement system may further include a plurality of photodetectors configured to operate in accordance with an input bias voltage. The optical measurement system may further include a control circuit configured to identify a photodetector subset included in the plurality of photodetectors and that detects, while the input bias voltage has a first value, photons of the light pulse after the light pulse is scattered by the target. The control circuit may be further configured to determine, based on the identifying of the photodetector subset, an overvoltage associated with the photodetector subset. The control circuit may be further configured to update, based on the overvoltage, the input bias voltage for the plurality of photodetectors to have a second value.

Such updates to the input bias voltage based on measured overvoltages of photodetectors that have detected photons may result in consistent measurements by a detector of the optical measurement system despite thermal variance. Such consistent measurements may allow more accurate and useful metrics and predictions (e.g., of mental states of a user, blood oxygenation levels of the user, etc.) based on histogram data generated based on the measurements.

Mental states described herein refer to the measured neural activity related to physiological brain states and/or mental brain states, e.g., joy, excitement, relaxation, surprise, fear, stress, anxiety, sadness, anger, disgust, contempt, contentment, calmness, focus, attention, approval, creativity, positive or negative reflections/attitude on experiences or the use of objects, etc. Further details on the methods and systems related to a predicted brain state, physiological functions, behavior, preferences, or attitude of the user, and the creation, training, and use of neuromes can be found in U.S. patent application Ser. No. 17/188,298, filed Mar. 1, 2021. Exemplary measurement systems and methods using biofeedback for awareness and modulation of mental state are described in more detail in U.S. patent application Ser. No. 16/364,338, filed Mar. 26, 2019, issued as U.S. Pat. No. 11,006,876. Exemplary measurement systems and methods used for detecting and modulating the mental state of a user using entertainment selections, e.g., music, film/video, are described in more detail in U.S. patent application Ser. No. 16/835,972, filed Mar. 31, 2020, issued as U.S. Pat. No. 11,006,878. Exemplary measurement systems and methods used for detecting and modulating the mental state of a user using product formulation from, e.g., beverages, food, selective food/drink ingredients, fragrances, and assessment based on product-elicited brain state measurements are described in more detail in U.S. patent application Ser. No. 16/853,614, filed Apr. 20, 2020, published as US2020/

0337624A1. Exemplary measurement systems and methods used for detecting and modulating the mental state of a user through awareness of priming effects are described in more detail in U.S. patent application Ser. No. 16/885,596, filed May 28, 2020, published as US2020/0390358A1. Exemplary measurement systems and methods used for wellness therapy, such as pain management regime, are described more fully in U.S. Provisional Application No. 63/188,783, filed May 14, 2021. These applications and corresponding U.S. publications are incorporated herein by reference in their entirety.

These and other advantages and benefits of the present systems and methods are described more fully herein.

FIG. 1 shows an exemplary optical measurement system 100 configured to perform an optical measurement operation with respect to a body 102. Optical measurement system 100 may, in some examples, be portable and/or wearable by a user. Optical measurement systems that may be used in connection with the embodiments described herein are described more fully in U.S. patent application Ser. No. 17/176,315, filed Feb. 16, 2021; U.S. patent application Ser. No. 17/176,309, filed Feb. 16, 2021; U.S. patent application Ser. No. 17/176,460, filed Feb. 16, 2021; U.S. patent application Ser. No. 17/176,470, filed Feb. 16, 2021; U.S. patent application Ser. No. 17/176,487, filed Feb. 16, 2021; U.S. patent application Ser. No. 17/176,539, filed Feb. 16, 2021; U.S. patent application Ser. No. 17/176,560, filed Feb. 16, 2021; U.S. patent application Ser. No. 17/176,466, filed Feb. 16, 2021, and Han Y. Ban, et al., "Kernel Flow: A High Channel Count Scalable TD-fNIRS System," SPIE Photonics West Conference (Mar. 6, 2021), which applications and publication are incorporated herein by reference in their entirety.

In some examples, optical measurement operations performed by optical measurement system 100 are associated with a time domain-based optical measurement technique. Example time domain-based optical measurement techniques include, but are not limited to, time-correlated single-photon counting (TCSPC), time domain near infrared spectroscopy (TD-NIRS), time domain diffusive correlation spectroscopy (TD-DCS), and time domain Digital Optical Tomography (TD-DOT).

Optical measurement system 100 (e.g., an optical measurement system that is implemented by a wearable device or other configuration, and that employs a time domain-based (e.g., TD-NIRS) measurement technique) may detect blood oxygenation levels and/or blood volume levels by measuring the change in shape of laser pulses after they have passed through target tissue, e.g., brain, muscle, finger, etc. As used herein, a shape of laser pulses refers to a temporal shape, as represented for example by a histogram generated by a time-to-digital converter (TDC) coupled to an output of a photodetector, as will be described more fully below.

As shown, optical measurement system 100 includes a detector 104 that includes a plurality of individual photodetectors (e.g., photodetector 106), a processor 108 coupled to detector 104, a light source 110, a controller 112, and optical conduits 114 and 116 (e.g., light pipes). However, one or more of these components may not, in certain embodiments, be considered to be a part of optical measurement system 100. For example, in implementations where optical measurement system 100 is wearable by a user, processor 108 and/or controller 112 may in some embodiments be separate from optical measurement system 100 and not configured to be worn by the user.

Detector 104 may include any number of photodetectors 106 as may serve a particular implementation, such as $2^n$ photodetectors (e.g., 256, 512, ..., 16384, etc.), where n is an integer greater than or equal to one (e.g., 4, 5, 8, 10, 11, 14, etc.). Photodetectors 106 may be arranged in any suitable manner.

Photodetectors 106 may each be implemented by any suitable circuit configured to detect individual photons of light incident upon photodetectors 106. For example, each photodetector 106 may be implemented by a single photon avalanche diode (SPAD) circuit and/or other circuitry as may serve a particular implementation.

Processor 108 may be implemented by one or more physical processing (e.g., computing) devices. In some examples, processor 108 may execute instructions (e.g., software) configured to perform one or more of the operations described herein.

Light source 110 may be implemented by any suitable component configured to generate and emit light. For example, light source 110 may be implemented by one or more laser diodes, distributed feedback (DFB) lasers, super luminescent diodes (SLDs), light emitting diodes (LEDs), diode-pumped solid-state (DPSS) lasers, super luminescent light emitting diodes (sLEDs), vertical-cavity surface-emitting lasers (VCSELs), titanium sapphire lasers, micro light emitting diode (mLEDs), and/or any other suitable laser or light source configured to emit light in one or more discrete wavelengths or narrow wavelength bands. In some examples, the light emitted by light source 110 is high coherence light (e.g., light that has a coherence length of at least 5 centimeters) at a predetermined center wavelength. In some examples, the light emitted by light source 110 is emitted as a plurality of alternating light pulses of different wavelengths.

Light source 110 is controlled by controller 112, which may be implemented by any suitable computing device (e.g., processor 108), integrated circuit, and/or combination of hardware and/or software as may serve a particular implementation. In some examples, controller 112 is configured to control light source 110 by turning light source 110 on and off and/or setting an intensity of light generated by light source 110. Controller 112 may be manually operated by a user, or may be programmed to control light source 110 automatically.

Light emitted by light source 110 travels via an optical conduit 114 (e.g., a light pipe, a single-mode optical fiber, and/or or a multi-mode optical fiber) to body 102 of a subject. Body 102 may include any suitable turbid medium. For example, in some implementations, body 102 is a head or any other body part (e.g., a hand, wrist, finger, foot, chest, or ear) of a human or other animal. Alternatively, body 102 may be a non-living object. For illustrative purposes, it will be assumed in the examples provided herein that body 102 is a human head.

As indicated by an arrow 120, light emitted by light source 110 enters body 102 at a first location 122 on body 102. Accordingly, a distal end of optical conduit 114 may be positioned at (e.g., right above, in physical contact with, or physically attached to) first location 122 (e.g., to a scalp of the subject). In some examples, the light may emerge from optical conduit 114 and spread out to a certain spot size on body 102 to fall under a predetermined safety limit. At least a portion of the light indicated by arrow 120 may be scattered within body 102.

As used herein, "distal" means nearer, along the optical path of the light emitted by light source 110 or the light received by detector 104, to the target (e.g., within body 102) than to light source 110 or detector 104. Thus, the distal end of optical conduit 114 is nearer to body 102 than to light source 110, and the distal end of optical conduit 116 is nearer to body 102 than to detector 104. Additionally, as used herein, "proximal" means nearer, along the optical path of the light emitted by light source 110 or the light received by detector 104, to light source 110 or detector 104 than to body 102. Thus, the proximal end of optical conduit 114 is nearer to light source 110 than to body 102, and the proximal end of optical conduit 116 is nearer to detector 104 than to body 102.

As shown, the distal end of optical conduit 116 (e.g., a light pipe, a light guide, a waveguide, a single-mode optical fiber, and/or a multi-mode optical fiber) is positioned at (e.g., right above, in physical contact with, or physically attached to) output location 126 on body 102. In this manner, optical conduit 116 may collect at least a portion of the scattered light (indicated as light 124) as it exits body 102 at location 126 and carry light 124 to detector 104. Light 124 may pass through one or more lenses and/or other optical elements (not shown) that direct light 124 onto each of the photodetectors 106 included in detector 104.

Photodetectors 106 may be connected in parallel in detector 104. An output of each of photodetectors 106 may be accumulated to generate an accumulated output of detector 104. Processor 108 may receive the accumulated output and determine, based on the accumulated output, a temporal distribution of photons detected by photodetectors 106. Processor 108 may then generate, based on the temporal distribution, a histogram representing a light pulse response of a target (e.g., brain tissue, blood flow, etc.) in body 102. Example embodiments of accumulated outputs are described herein.

Figure 2:
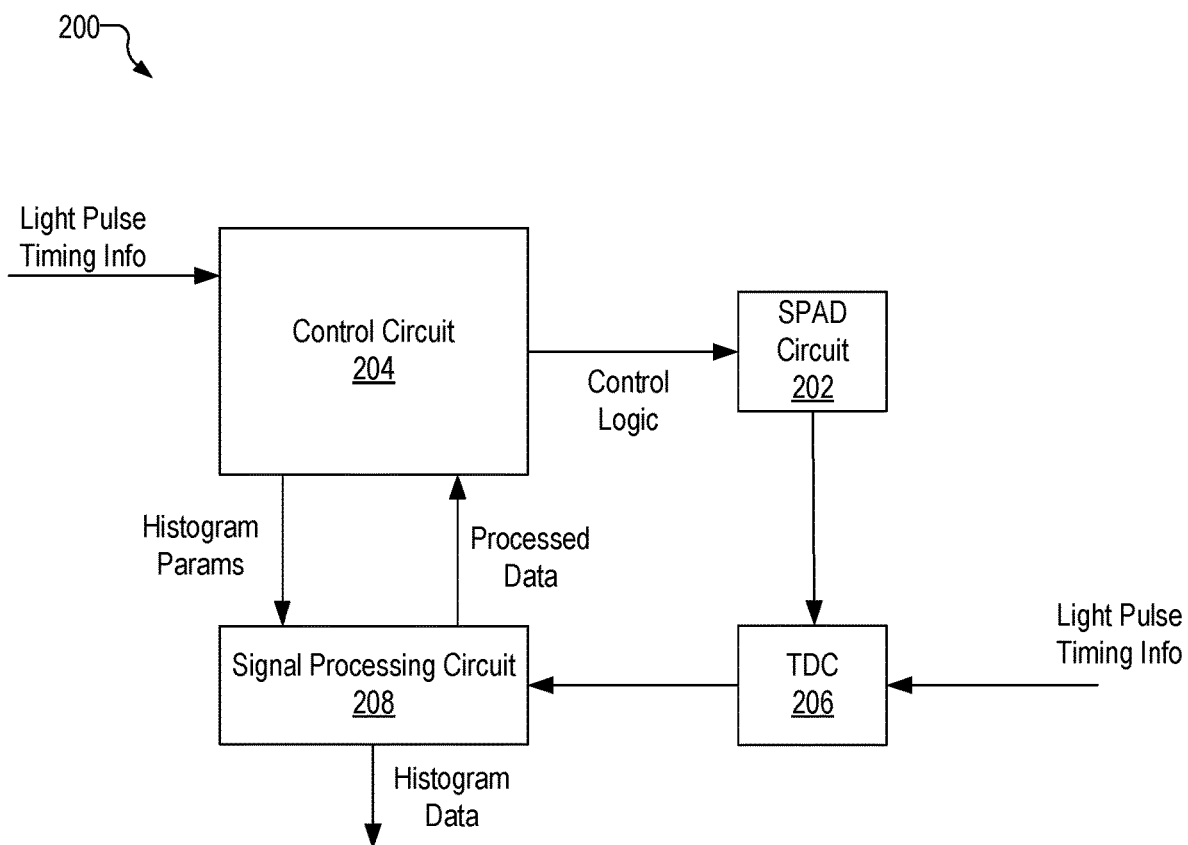
FIG. 2 illustrates an exemplary detector architecture.

FIG. 2 illustrates an exemplary detector architecture 200 that may be used in accordance with the systems and methods described herein. As shown, architecture 200 includes a SPAD circuit 202 that implements photodetector 106, a control circuit 204, a time-to-digital converter (TDC) 206, and a signal processing circuit 208. Architecture 200 may include additional or alternative components as may serve a particular implementation.

In some examples, SPAD circuit 202 may include a SPAD and a fast gating circuit configured to operate together to detect a photon incident upon the SPAD. As described herein, SPAD circuit 202 may generate an output when SPAD circuit 202 detects a photon.

The fast gating circuit included in SPAD circuit 202 may be implemented in any suitable manner. For example, the fast gating circuit may include a capacitor that is pre-charged with a bias voltage before a command is provided to arm the SPAD. Gating the SPAD with a capacitor instead of with an active voltage source, such as is done in some conventional SPAD architectures, has a number of advantages and benefits. For example, a SPAD that is gated with a capacitor may be armed practically instantaneously compared to a SPAD that is gated with an active voltage source. This is because the capacitor is already charged with the bias voltage when a command is provided to arm the SPAD. This is described more fully in U.S. Pat. Nos. 10,158,038 and 10,424,683, which are incorporated herein by reference in their entireties.

In some alternative configurations, such as in configurations that implement the systems and methods described herein, SPAD circuit 202 does not include a fast gating circuit. In these configurations, the SPAD included in SPAD circuit 202 may be gated in any suitable manner or be configured to operate in a free running mode with passive quenching.

Control circuit 204 may be implemented by an application specific integrated circuit (ASIC) or any other suitable circuit configured to control an operation of various components within SPAD circuit 202. For example, control circuit 204 may output control logic that puts the SPAD included in SPAD circuit 202 in either an armed or a disarmed state.

In some examples, control circuit 204 may control a gate delay, which specifies a predetermined amount of time control circuit 204 is to wait after an occurrence of a light pulse (e.g., a laser pulse) to put the SPAD in the armed state. To this end, control circuit 204 may receive light pulse timing information, which indicates a time at which a light pulse occurs (e.g., a time at which the light pulse is applied to body 102). Control circuit 204 may also control a programmable gate width, which specifies how long the SPAD is kept in the armed state before being disarmed.

Control circuit 204 is further configured to control signal processing circuit 208. For example, control circuit 204 may provide histogram parameters (e.g., time bins, number of light pulses, type of histogram, etc.) to signal processing circuit 208. Signal processing circuit 208 may generate histogram data in accordance with the histogram parameters. In some examples, control circuit 204 is at least partially implemented by controller 112.

TDC 206 is configured to measure a time difference between an occurrence of an output pulse generated by SPAD circuit 202 and an occurrence of a light pulse. To this end, TDC 206 may also receive the same light pulse timing information that control circuit 204 receives. TDC 206 may be implemented by any suitable circuitry as may serve a particular implementation.

Signal processing circuit 208 is configured to perform one or more signal processing operations on data output by TDC 206. For example, signal processing circuit 208 may generate histogram data based on the data output by TDC 206 and in accordance with histogram parameters provided by control circuit 204. To illustrate, signal processing circuit 208 may generate, store, transmit, compress, analyze, decode, and/or otherwise process histograms based on the data output by TDC 206. In some examples, signal processing circuit 208 may provide processed data to control circuit 204, which may use the processed data in any suitable manner. In some examples, signal processing circuit 208 is at least partially implemented by processor 108.

In some examples, each photodetector 106 (e.g., SPAD circuit 202) may have a dedicated TDC 206 associated therewith. For example, for an array of N photodetectors 106, there may be a corresponding array of N TDCs 206. Alternatively, a single TDC 206 may be associated with multiple photodetectors 106. Likewise, a single control circuit 204 and a single signal processing circuit 208 may be provided for a one or more photodetectors 106 and/or TDCs 206.

Figure 3:
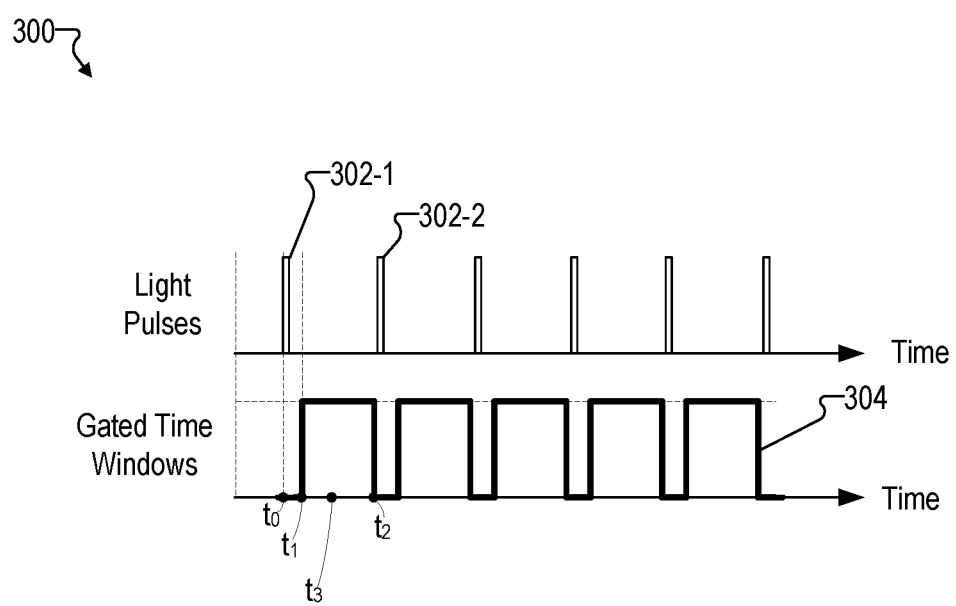
FIG. 3 illustrates an exemplary timing diagram for performing an optical measurement operation using an optical measurement system.

FIG. 3 illustrates an exemplary timing diagram 300 for performing an optical measurement operation using optical measurement system 100. The optical measurement operation may be performed in accordance with a time domain-based technique, such as TD-NIRS. Optical measurement system 100 may be configured to perform the optical measurement operation by directing light pulses (e.g., laser pulses) toward a target within a body (e.g., body 102). The light pulses may be short (e.g., 10-2000 picoseconds (ps)) and repeated at a high frequency (e.g., between 100,000 hertz (Hz) and 100 megahertz (MHz)). The light pulses may be scattered by the target and at least a portion of the scattered light may be detected by optical measurement system 100. Optical measurement system 100 may measure a time relative to the light pulse for each detected photon. By counting the number of photons detected at each time relative to each light pulse repeated over a plurality of light pulses, optical measurement system 100 may generate a histogram that represents a light pulse response of the target (e.g., a temporal point spread function (TPSF)). The terms histogram and TPSF are used interchangeably herein to refer to a light pulse response of a target.

Timing diagram 300 shows a sequence of light pulses 302 (e.g., light pulses 302-1 and 302-2) that may be applied to the target (e.g., tissue within a finger of a user, tissue within a brain of a user, blood flow, a fluorescent material used as a probe in a body of a user, etc.). Timing diagram 300 also shows a pulse wave 304 representing predetermined gated time windows (also referred as gated time periods) during which photodetectors 106 are gated ON to detect photons. As shown, light pulse 302-1 is applied at a time $t_0$. At a time $t_1$, a first instance of the predetermined gated time window begins. Photodetectors 106 may be armed at time $t_1$, enabling photodetectors 106 to detect photons scattered by the target during the predetermined gated time window. In this example, time $t_1$ is set to be at a certain time after time $t_0$, which may minimize photons detected directly from the laser pulse, before the laser pulse reaches the target. However, in some alternative examples, time $t_1$ is set to be equal to time $t_0$.

At a time $t_2$, the predetermined gated time window ends. In some examples, photodetectors 106 may be disarmed at time $t_2$. In other examples, photodetectors 106 may be reset (e.g., disarmed and re-armed) at time $t_2$ or at a time subsequent to time $t_2$. During the predetermined gated time window, photodetectors 106 may detect photons scattered by the target. Photodetectors 106 may be configured to remain armed during the predetermined gated time window such that photodetectors 106 maintain an output upon detecting a photon during the predetermined gated time window. For example, a photodetector 106 may detect a photon at a time $t_3$, which is during the predetermined gated time window between times ti and $t_2$. The photodetector 106 may be configured to provide an output indicating that the photodetector 106 has detected a photon. The photodetector 106 may be configured to continue providing the output until time $t_2$, when the photodetector may be disarmed and/or reset. Optical measurement system 100 may generate an accumulated output from the plurality of photodetectors. Optical measurement system 100 may sample the accumulated output to determine times at which photons are detected by photodetectors 106 to generate a TPSF.

As mentioned, in some alternative examples, photodetector 106 may be configured to operate in a free-running mode such that photodetector 106 is not actively armed and disarmed (e.g., at the end of each predetermined gated time window represented by pulse wave 304). In contrast, while operating in the free-running mode, photodetector 106 may be configured to reset within a configurable time period after an occurrence of a photon detection event (i.e., after photodetector 106 detects a photon) and immediately begin detecting new photons. However, only photons detected within a desired time window (e.g., during each gated time window represented by pulse wave 304) may be included in the TPSF.

Figure 4:
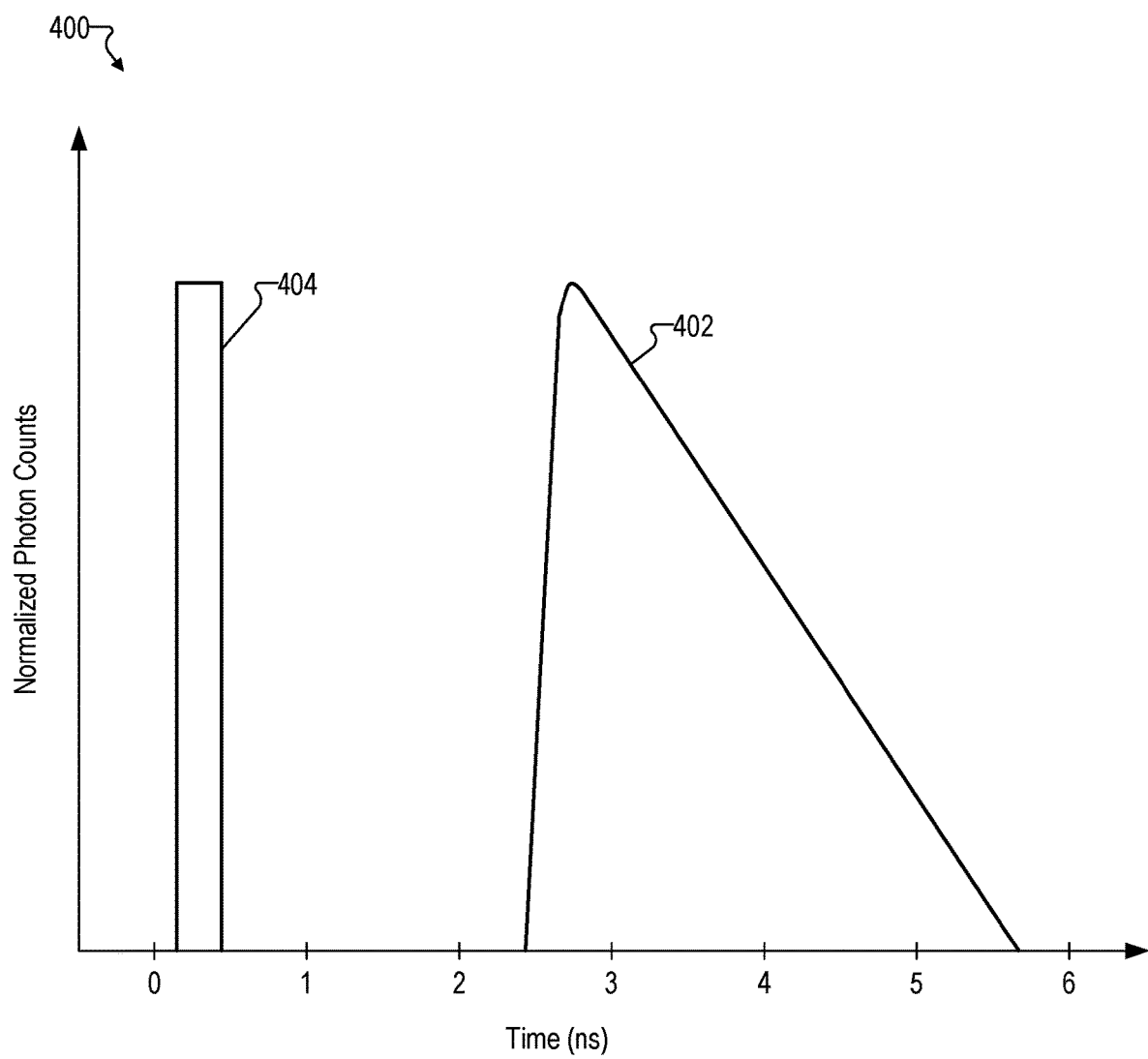
FIG. 4 illustrates a graph of an exemplary temporal point spread function that may be generated by an optical measurement system in response to a light pulse.

FIG. 4 illustrates a graph 400 of an exemplary TPSF 402 that may be generated by optical measurement system 100 in response to a light pulse 404 (which, in practice, represents a plurality of light pulses). Graph 400 shows a normalized count of photons on a y-axis and time bins on an x-axis. As shown, TPSF 402 is delayed with respect to a temporal occurrence of light pulse 404. In some examples, the number of photons detected in each time bin subsequent to each occurrence of light pulse 404 may be aggregated (e.g., integrated) to generate TPSF 402. TPSF 402 may be analyzed and/or processed in any suitable manner to determine or infer biological activity.

Optical measurement system 100 may be implemented by or included in any suitable device. For example, optical measurement system 100 may be included in a non-invasive wearable device (e.g., a headpiece) that a user may wear to perform one or more diagnostic, imaging, analytical, and/or consumer-related operations.

Figure 5:
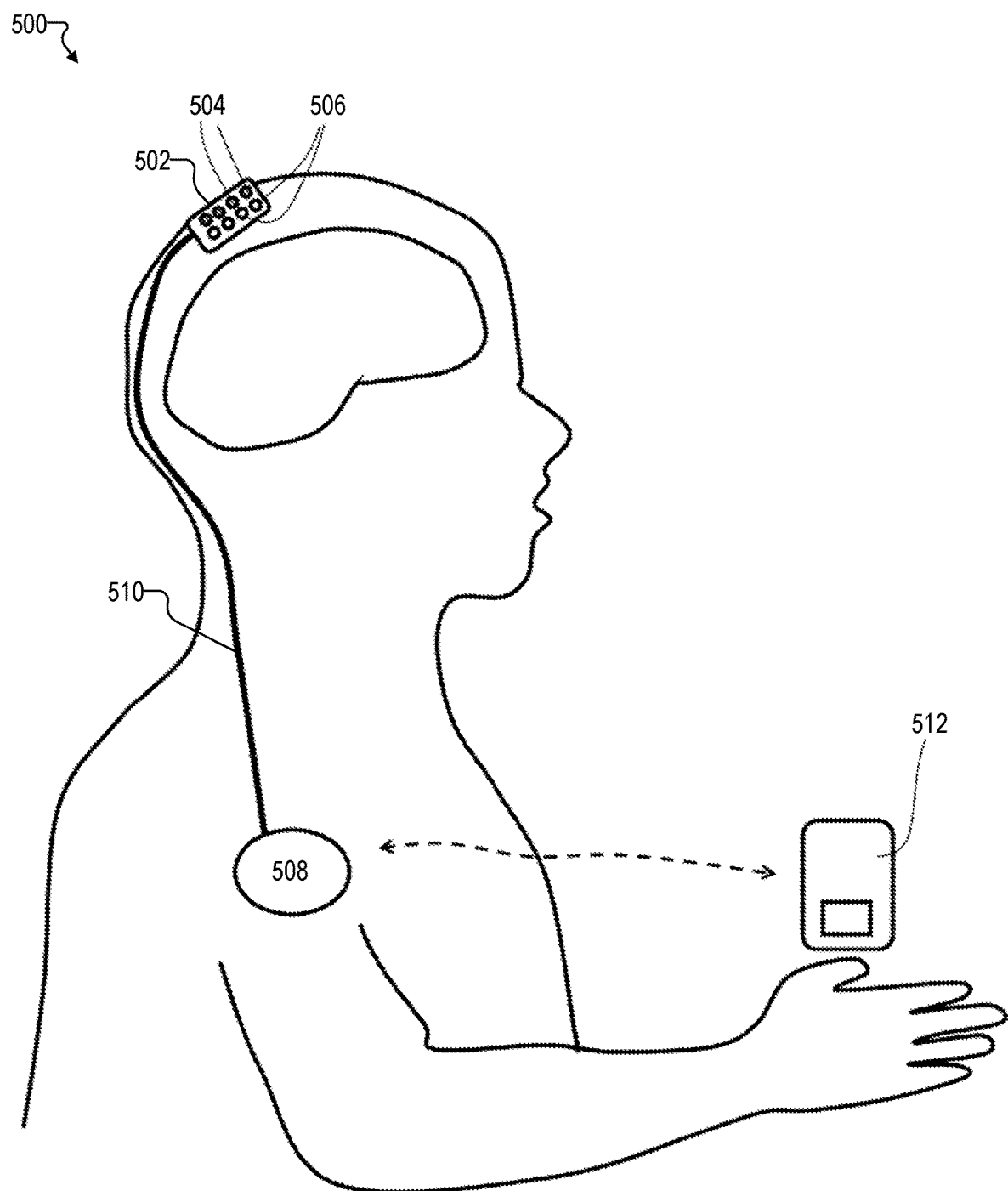
FIG. 5 shows an exemplary non-invasive wearable brain interface system.

To illustrate, FIG. 5 shows an exemplary non-invasive wearable brain interface system 500 ("brain interface system 500") that implements optical measurement system 100 (shown in FIG. 1). As shown, brain interface system 500 includes a head-mountable component 502 configured to be a wearable device (e.g., headgear) configured to be worn on a user's head. Head-mountable component 502 may be implemented by a cap shape that is worn on a head of a user. Alternative implementations of head-mountable component 502 include helmets, beanies, headbands, other hat shapes, or other forms conformable to be worn on a user's head, etc. Head-mountable component 502 may be made out of any suitable cloth, soft polymer, plastic, hard shell, and/or any other suitable material as may serve a particular implementation. Examples of headgears used with wearable brain interface systems are described more fully in U.S. Pat. No. 10,340,408, incorporated herein by reference in its entirety.

Head-mountable component 502 includes a plurality of detectors 504, which may implement or be similar to detector 104, and a plurality of light sources 506, which may be implemented by or be similar to light source 110. It will be recognized that in some alternative embodiments, head-mountable component 502 may include a single detector 504 and/or a single light source 506.

Brain interface system 500 may be used for controlling an optical path to the brain and for transforming photodetector measurements into an intensity value that represents an optical property of a target within the brain. Brain interface system 500 allows optical detection of deep anatomical locations beyond skin and bone (e.g., skull) by extracting data from photons originating from light source 506 and emitted to a target location within the user's brain, in contrast to conventional imaging systems and methods (e.g., optical coherence tomography (OCT)), which only image superficial tissue structures or through optically transparent structures.

Brain interface system 500 may further include a processor 508 configured to communicate with (e.g., control and/or receive signals from) detectors 504 and light sources 506 by way of a communication link 510. Communication link 510 may include any suitable wired and/or wireless communication link. Processor 508 may include any suitable housing and may be located on the user's scalp, neck, shoulders, chest, or arm, as may be desirable. In some variations, processor 508 may be integrated in the same assembly housing as detectors 504 and light sources 506.

As shown, brain interface system 500 may optionally include a remote processor 512 in communication with processor 508. For example, remote processor 512 may store measured data from detectors 504 and/or processor 508 from previous detection sessions and/or from multiple brain interface systems (not shown). Power for detectors 504, light sources 506, and/or processor 508 may be provided via a wearable battery (not shown). In some examples, processor 508 and the battery may be enclosed in a single housing, and wires carrying power signals from processor 508 and the battery may extend to detectors 504 and light sources 506. Alternatively, power may be provided wirelessly (e.g., by induction).

In some alternative embodiments, head mountable component 502 does not include individual light sources. Instead, a light source configured to generate the light that is detected by detectors 504 may be included elsewhere in brain interface system 500. For example, a light source may be included in processor 508 and coupled to head mountable component 502 through optical connections.

Optical measurement system 100 may alternatively be included in a non-wearable device (e.g., a medical device and/or consumer device that is placed near the head or other body part of a user to perform one or more diagnostic, imaging, and/or consumer-related operations). Optical measurement system 100 may alternatively be included in a sub-assembly enclosure of a wearable invasive device (e.g., an implantable medical device for brain recording and imaging).

Figure 6:
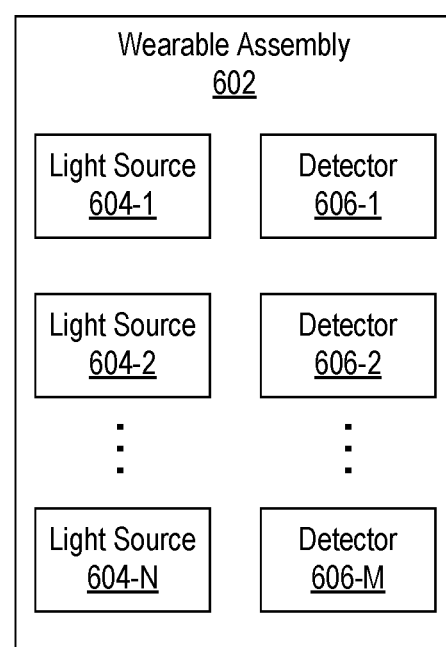
FIG. 6 shows an exemplary optical measurement system.

FIG. 6 shows an exemplary optical measurement system 600 in accordance with the principles described herein. Optical measurement system 600 may be an implementation of optical measurement system 100 and, as shown, includes a wearable assembly 602, which includes N light sources 604 (e.g., light sources 604-1 through 604-N) and M detectors 606 (e.g., detectors 606-1 through 606-M). Optical measurement system 600 may include any of the other components of optical measurement system 100 as may serve a particular implementation. N and M may each be any suitable value (i.e., there may be any number of light sources 604 and detectors 606 included in optical measurement system 600 as may serve a particular implementation).

Light sources 604 are each configured to emit light (e.g., a sequence of light pulses) and may be implemented by any of the light sources described herein. Detectors 606 may each be configured to detect arrival times for photons of the light emitted by one or more light sources 604 after the light is scattered by the target. For example, a detector 606 may include a photodetector configured to generate a photodetector output pulse in response to detecting a photon of the light and a TDC configured to record a timestamp symbol in response to an occurrence of the photodetector output pulse, the timestamp symbol representative of an arrival time for the photon (i.e., when the photon is detected by the photodetector).

Wearable assembly 602 may be implemented by any of the wearable devices, modular assemblies, and/or wearable units described herein. For example, wearable assembly 602 may be implemented by a wearable device (e.g., headgear) configured to be worn on a user's head. Wearable assembly 602 may additionally or alternatively be configured to be worn on any other part of a user's body.

Optical measurement system 600 may be modular in that one or more components of optical measurement system 600 may be removed, changed out, or otherwise modified as may serve a particular implementation. As such, optical measurement system 600 may be configured to conform to three-dimensional surface geometries, such as a user's head. Exemplary modular optical measurement systems are described in more detail in U.S. patent application Ser. No. 17/176,460, filed Feb. 16, 2021, U.S. patent application Ser. No. 17/176,470, filed Feb. 16, 2021, U.S. patent application Ser. No. 17/176,487, filed Feb. 16, 2021, U.S. patent application Ser. No. 17/176,539, filed Feb. 16, 2021, U.S. patent application Ser. No. 17/176,560, filed Feb. 16, 2021, and U.S. patent application Ser. No. 17/176,466, filed Feb. 16, 2021, which applications are incorporated herein by reference in their respective entireties.

Figure 7:
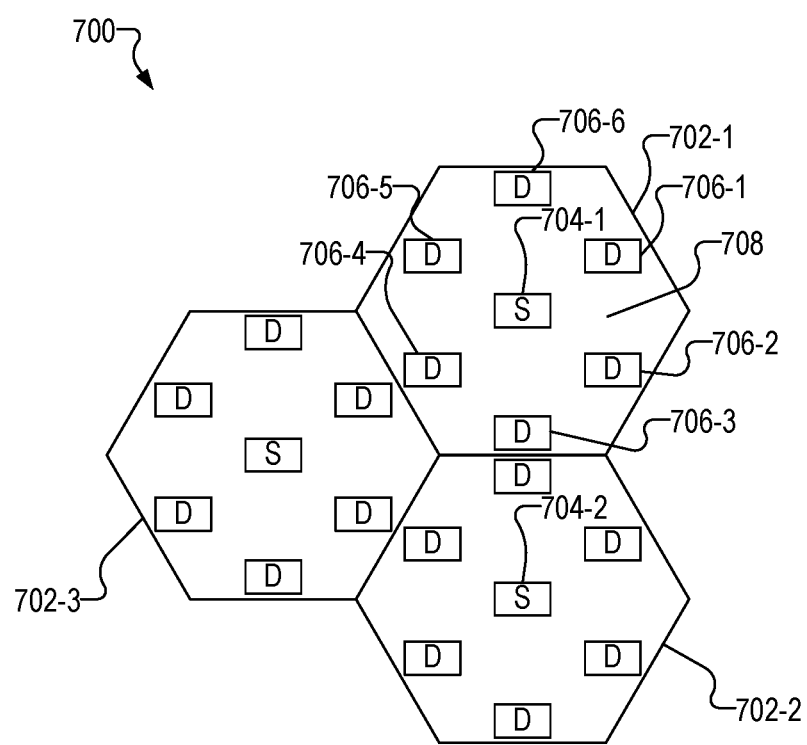
FIG. 7 shows an illustrative modular assembly.

FIG. 7 shows an illustrative modular assembly 700 that may implement optical measurement system 600. Modular assembly 700 is illustrative of the many different implementations of optical measurement system 600 that may be realized in accordance with the principles described herein.

As shown, modular assembly 700 includes a plurality of modules 702 (e.g., modules 702-1 through 702-3). While three modules 702 are shown to be included in modular assembly 700, in alternative configurations, any number of modules 702 (e.g., a single module up to sixteen or more modules) may be included in modular assembly 700.

Each module 702 includes a light source (e.g., light source 704-1 of module 702-1 and light source 704-2 of module 702-2) and a plurality of detectors (e.g., detectors 706-1 through 706-6 of module 702-1). In the particular implementation shown in FIG. 7, each module 702 includes a single light source and six detectors. Each light source is labeled "S" and each detector is labeled "D".

Each light source depicted in FIG. 7 may be implemented by one or more light sources similar to light source 110 and may be configured to emit light directed at a target (e.g., the brain).

Each light source depicted in FIG. 7 may be located at a center region of a surface of the light source's corresponding module. For example, light source 704-1 is located at a center region of a surface 708 of module 702-1. In alternative implementations, a light source of a module may be located away from a center region of the module.

Each detector depicted in FIG. 7 may implement or be similar to detector 104 and may include a plurality of photodetectors (e.g., SPADs) as well as other circuitry (e.g., TDCs), and may be configured to detect arrival times for photons of the light emitted by one or more light sources after the light is scattered by the target.

The detectors of a module may be distributed around the light source of the module. For example, detectors 706 of module 702-1 are distributed around light source 704-1 on surface 708 of module 702-1. In this configuration, detectors 706 may be configured to detect photon arrival times for photons included in light pulses emitted by light source 704-1. In some examples, one or more detectors 706 may be close enough to other light sources to detect photon arrival times for photons included in light pulses emitted by the other light sources. For example, because detector 706-3 is adjacent to module 702-2, detector 706-3 may be configured to detect photon arrival times for photons included in light pulses emitted by light source 704-2 (in addition to detecting photon arrival times for photons included in light pulses emitted by light source 704-1).

In some examples, the detectors of a module may all be equidistant from the light source of the same module. In other words, the spacing between a light source (i.e., a distal end portion of a light source optical conduit) and the detectors (i.e., distal end portions of optical conduits for each detector) are maintained at the same fixed distance on each module to ensure homogeneous coverage over specific areas and to facilitate processing of the detected signals. The fixed spacing also provides consistent spatial (lateral and depth) resolution across the target area of interest, e.g., brain tissue. Moreover, maintaining a known distance between the light source, e.g., light emitter, and the detector allows subsequent processing of the detected signals to infer spatial (e.g., depth localization, inverse modeling) information about the detected signals. Detectors of a module may be alternatively disposed on the module as may serve a particular implementation.

Figure 8A:
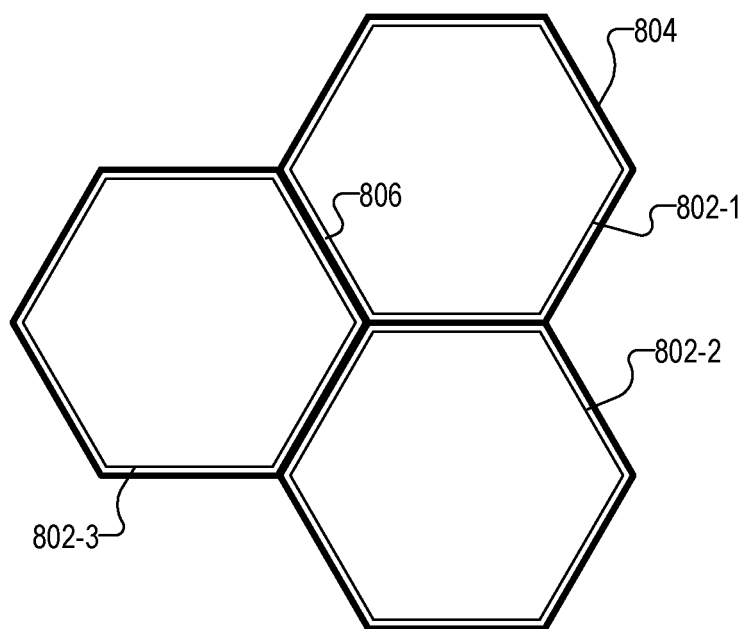
FIGS. 8A-8B show an exemplary implementation of the modular assembly of FIG. 7.
Figure 8B:
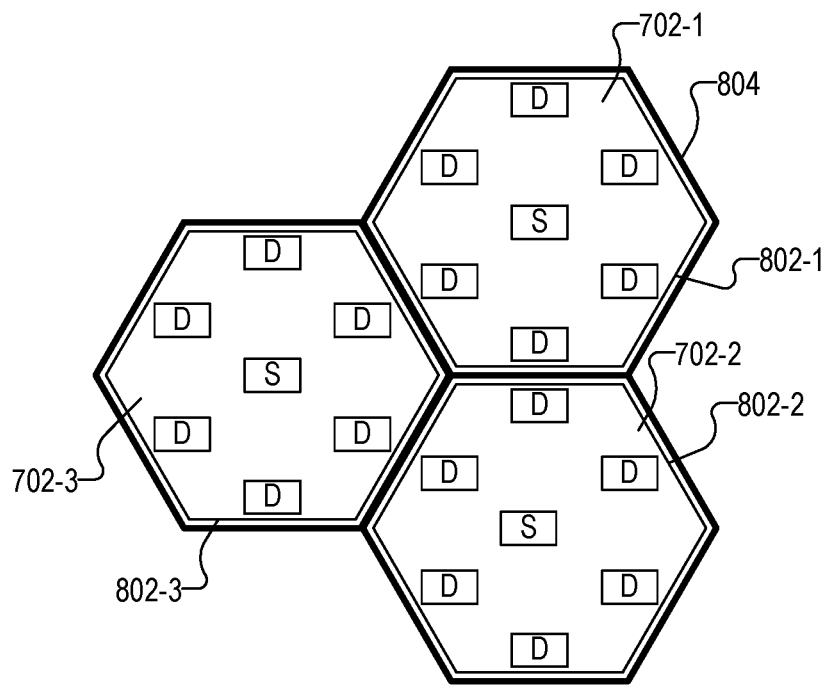

In FIG. 7, modules 702 are shown to be adjacent to and touching one another. Modules 702 may alternatively be spaced apart from one another. For example, FIGS. 8A-8B show an exemplary implementation of modular assembly 700 in which modules 702 are configured to be inserted into individual slots 802 (e.g., slots 802-1 through 802-3, also referred to as cutouts) of a wearable assembly 804. In particular, FIG. 8A shows the individual slots 802 of the wearable assembly 804 before modules 702 have been inserted into respective slots 802, and FIG. 8B shows wearable assembly 804 with individual modules 702 inserted into respective individual slots 802.

Wearable assembly 804 may implement wearable assembly 602 and may be configured as headgear and/or any other type of device configured to be worn by a user.

As shown in FIG. 8A, each slot 802 is surrounded by a wall (e.g., wall 806) such that when modules 702 are inserted into their respective individual slots 802, the walls physically separate modules 702 one from another. In alternative embodiments, a module (e.g., module 702-1) may be in at least partial physical contact with a neighboring module (e.g., module 702-2).

Each of the modules described herein may be inserted into appropriately shaped slots or cutouts of a wearable assembly, as described in connection with FIGS. 8A-8B. However, for ease of explanation, such wearable assemblies are not shown in the figures.

As shown in FIGS. 7 and 8B, modules 702 may have a hexagonal shape. Modules 702 may alternatively have any other suitable geometry (e.g., in the shape of a pentagon, octagon, square, rectangular, circular, triangular, free-form, etc.).

Figure 9:
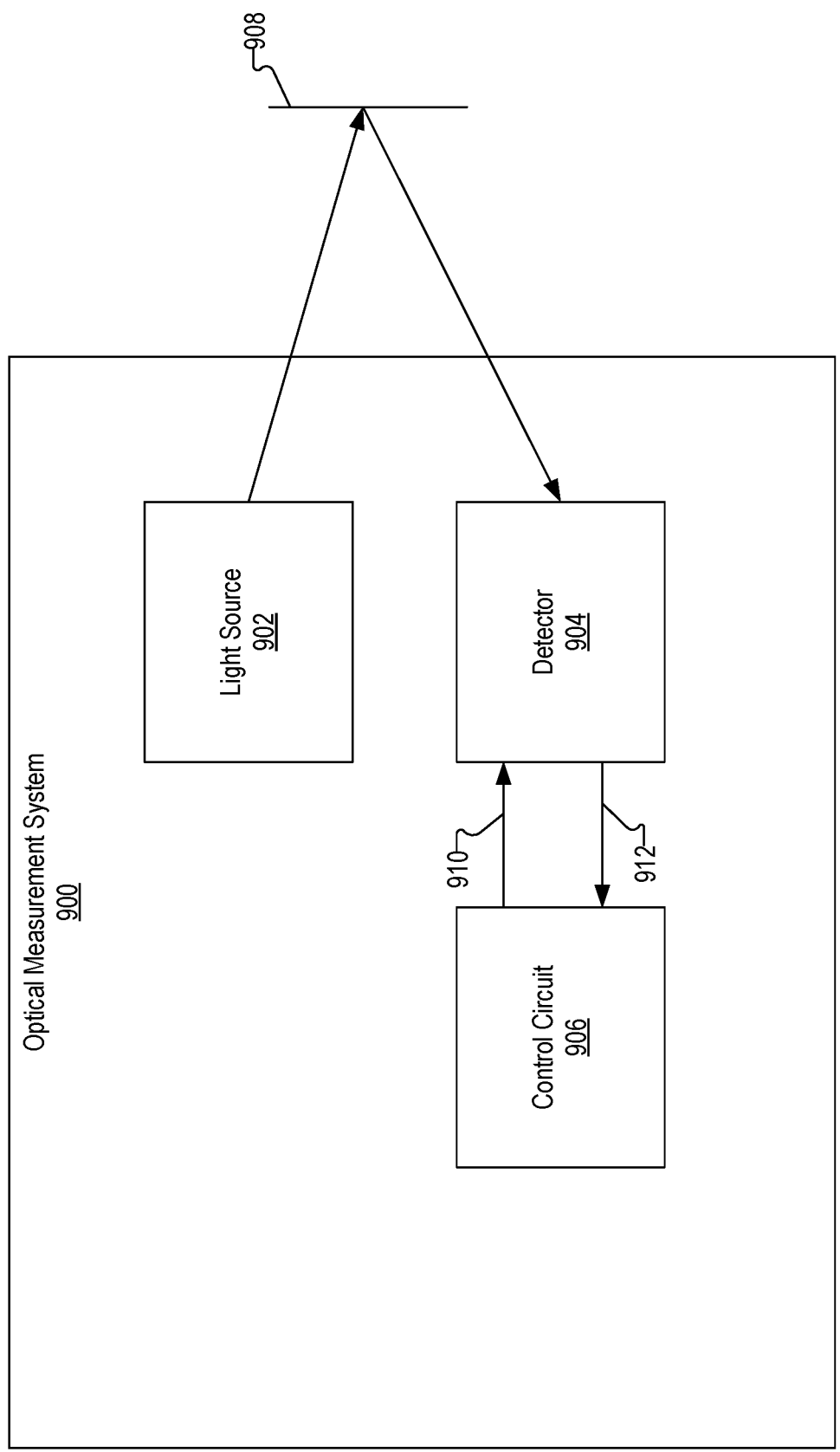
FIGS. 9-12 show exemplary optical measurement systems.

FIG. 9 shows an exemplary optical measurement system 900 that may be similar to and/or implement any of the optical measurement systems described herein. Optical measurement system 900 includes a light source 902 (e.g., an implementation of light source 110), a detector 904 (e.g., an implementation of detector 104), and a control circuit 906. Control circuit 906 may be implemented by controller 112 and/or any other suitable circuit, controller, computing and/or processing device. Exemplary implementations of control circuit 906 are described herein.

Light source 902 may be configured to direct light (e.g., light pulses) at a target 908 (e.g., body 102). Detector 904 may include a plurality of photodetectors configured to operate in accordance with an input bias voltage. Each photodetector may be configured to detect photons of the light emitted by light source 902 after the light is scattered by target 908. Detector 904 may detect arrival times of the photons at detector 904 and provide output data to a processing unit (e.g., an implementation of processor 108, not shown) indicating the arrival times. The processing unit may generate, based on the arrival times, histogram data (e.g., TPSF 402) associated with target 908. The processing unit may determine, based on the histogram data, an optical property associated with target 908.

Control circuit 906 may be configured to output to detector 904 a bias voltage 910 that is used to arm the photodetectors of detector 904. Bias voltage 910 may be configured to have a voltage level (e.g., a value) that is a predetermined voltage level greater than a breakdown voltage of the photodetectors. The voltage level difference between bias voltage 910 and the breakdown voltage may define an overvoltage for the photodetectors, which may affect a sensitivity of detector 904. For example, the breakdown voltage may be temperature dependent such that an increase in temperature may result in an increase in the breakdown voltage. If the voltage level of bias voltage 910 remains constant while the breakdown voltage increases, the overvoltage may decrease, which may result in a decreased sensitivity of detector 904.

Control circuit 906 may be configured to update the value of bias voltage 910 based on a measured overvoltage 912 of photodetectors of detector 904. Control circuit 906 may select the value so that a consistent overvoltage may be maintained despite fluctuations in the breakdown voltage. Control circuit 906 may be able to measure overvoltage 912 of a particular photodetector once the particular photodetector detects a photon (e.g., fires, avalanches, etc.), since the voltage level across the photodetector after detecting the photon may equal the breakdown voltage. Consequently, a remainder of bias voltage 910 after the photodetector detects the photon may equal overvoltage 912. Overvoltage 912 may be output by detector 904 to control circuit 906.

For example, control circuit 906 may output bias voltage 910 having a first value to detector 904. The first value may be selected so that bias voltage 910 is a predetermined overvoltage level above a breakdown voltage level of the photodetectors of detector 904. The first value may be determined based on a default breakdown voltage level and/or a previously measured overvoltage.

Light source 902 may emit a light pulse to target 908. Photons of the light pulse that reflect off of target 908 may be detected by some of the photodetectors of detector 904, but not by others. Thus, to measure overvoltage 912 from photodetectors that have detected photons of a particular light pulse, control circuit 906 may first identify which photodetectors included in the photodetectors of detector 904 actually detect the photons of the particular light pulse. As used herein, the photodetectors that detect photons of a particular light source are referred to as a "photodetector subset". Control circuit 906 may identify the photodetector subset in any suitable manner, examples of which are described herein.

Control circuit 906 may further determine, based on the photodetector subset, an overvoltage associated with the photodetector subset. For instance, the overvoltage associated with the photodetector subset may be an average (e.g., a mean, a median, a mode, etc.) of measured overvoltages 912 across the photodetectors of the photodetector subset. Additionally or alternatively, the overvoltage associated with the photodetector subset may be a random sampling of measured overvoltages 912 of one or more photodetectors of the photodetector subset.

Based on the overvoltage associated with the photodetector subset, control circuit 906 may update bias voltage 910 to have a second value. For example, the second value may be determined by adjusting from the first value based on a difference between the predetermined overvoltage level and the overvoltage associated with the photodetector subset to compensate for the difference. For instance, if the predetermined overvoltage level is 1 volt (V) but the overvoltage associated with the photodetector subset is determined to be 0.9 V, that may indicate that the breakdown voltage has increased by 0.1 V. Consequently, the value of bias voltage 910 may be increased by 0.1 V so that the overvoltage level is maintained at the predetermined overvoltage level of 1 V.

Light source 902 may emit another light pulse while bias voltage 910 has the second value, and control circuit 906 may be configured to repeat the process to update bias voltage 910 to have a third value. In some instances, the breakdown voltage may not change between light pulses and the second and/or third values may be the same as the first value. Further, control circuit 906 may be configured to update bias voltage 910 at any suitable intervals, including any suitable number of light pulses between updates. In some examples, the updating interval may be selected to include a plurality of light pulses so that there is a greater likelihood that at least some of the photodetectors have detected photons.

Based on such a feedback loop, where the value of bias voltage 910 is updated based on one or more measured overvoltages 912, optical measurement system 900 may maintain a consistent sensitivity and/or other characteristics of detector 904 regardless of changes in environmental properties (e.g., temperature, pressure, etc.) that may affect the breakdown voltage of detector 904.

Figure 10:
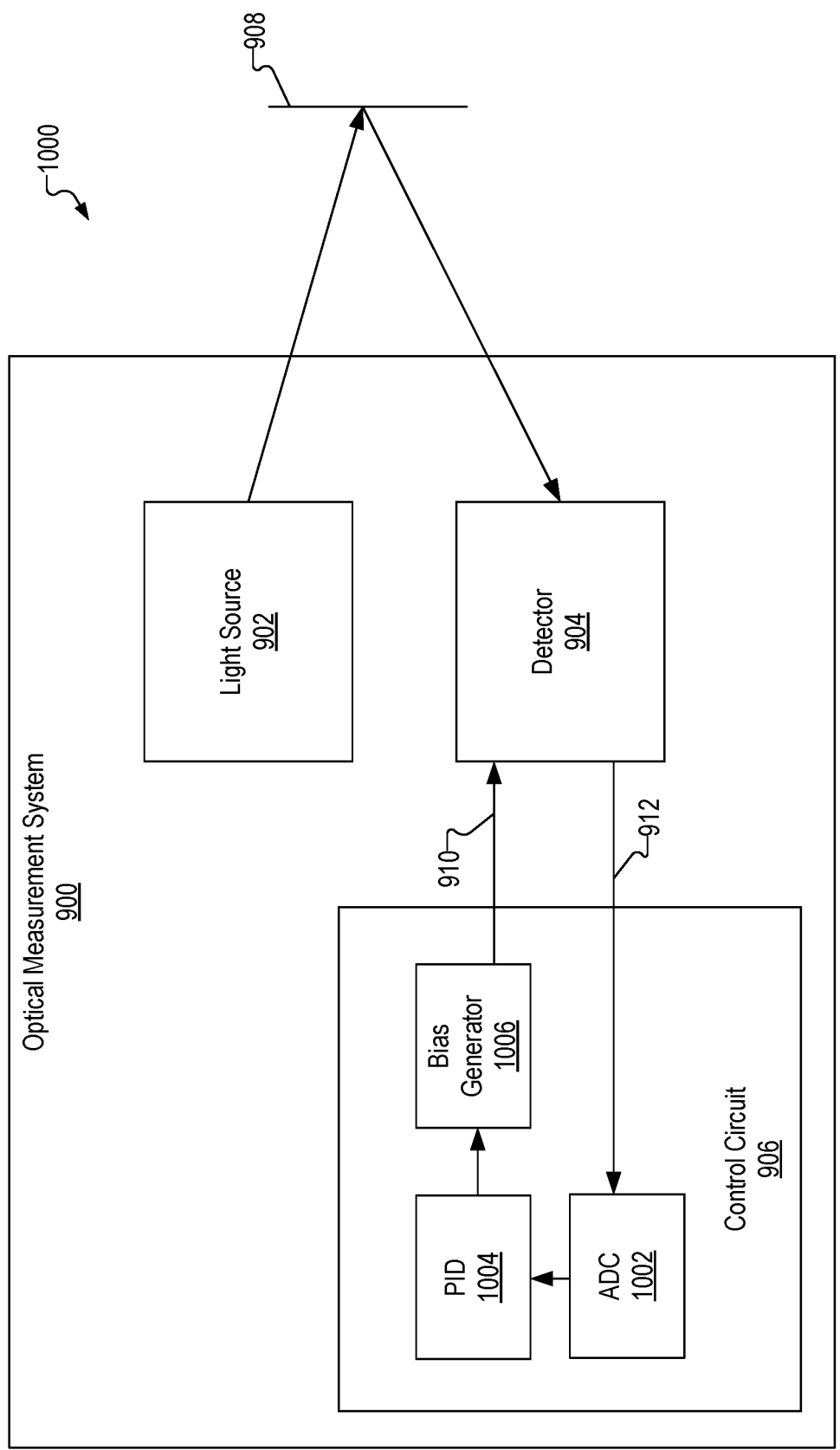

FIG. 10 illustrates an exemplary configuration 1000 of optical measurement system 900. Specifically, configuration 1000 shows an exemplary configuration of control circuit 906. In configuration 1000, control circuit 906 includes an analog-to-digital converter (ADC) 1002, a proportional-integral-derivative (PID) controller 1004, and a bias generator 1006.

ADC 1002 may be implemented by any suitable circuit, controller, computing and/or processing device. For example, ADC 1002 may include a high-precision ADC such as a sigma delta ADC or a successive approximation ADC. PID controller 1004 may also be implemented by any suitable circuit, controller, computing and/or processing device. In some examples, PID controller 1004 may be implemented by a proportional-integral (PI) controller.

The combination of ADC 1002 and PID controller 1004 may allow control circuit 906 to adjust the output bias voltage 910 quickly based on an input, such as an overvoltage associated with a photodetector subset of detector 904, that is precisely measured by ADC 1002. Thus, control circuit 906 may update bias voltage 910 with a much faster response time than conventional systems, which may use successive approximation control loops that iteratively to approach an optimal setpoint (e.g., a bias voltage based on a predetermined overvoltage). Such faster response times may be advantageous, especially for drastically changing temperature environments, which may occur during usage of optical measurement system 900. For instance, detector 904 may undergo rapid illumination changes, which may change power consumption and consequently operating temperatures of detector 904.

Bias generator 1006 may output bias voltage 910 having values based on the output of PID controller 1004. Bias generator 1006 may be implemented by any suitable circuit, controller, computing device, and/or processing device. For instance, bias generator 1006 may include an on-chip charge pump and/or an external low drop out regulator (LDO) with a digital-to-analog converter (DAC) to generate a reference voltage for the LDO.

Figure 11:
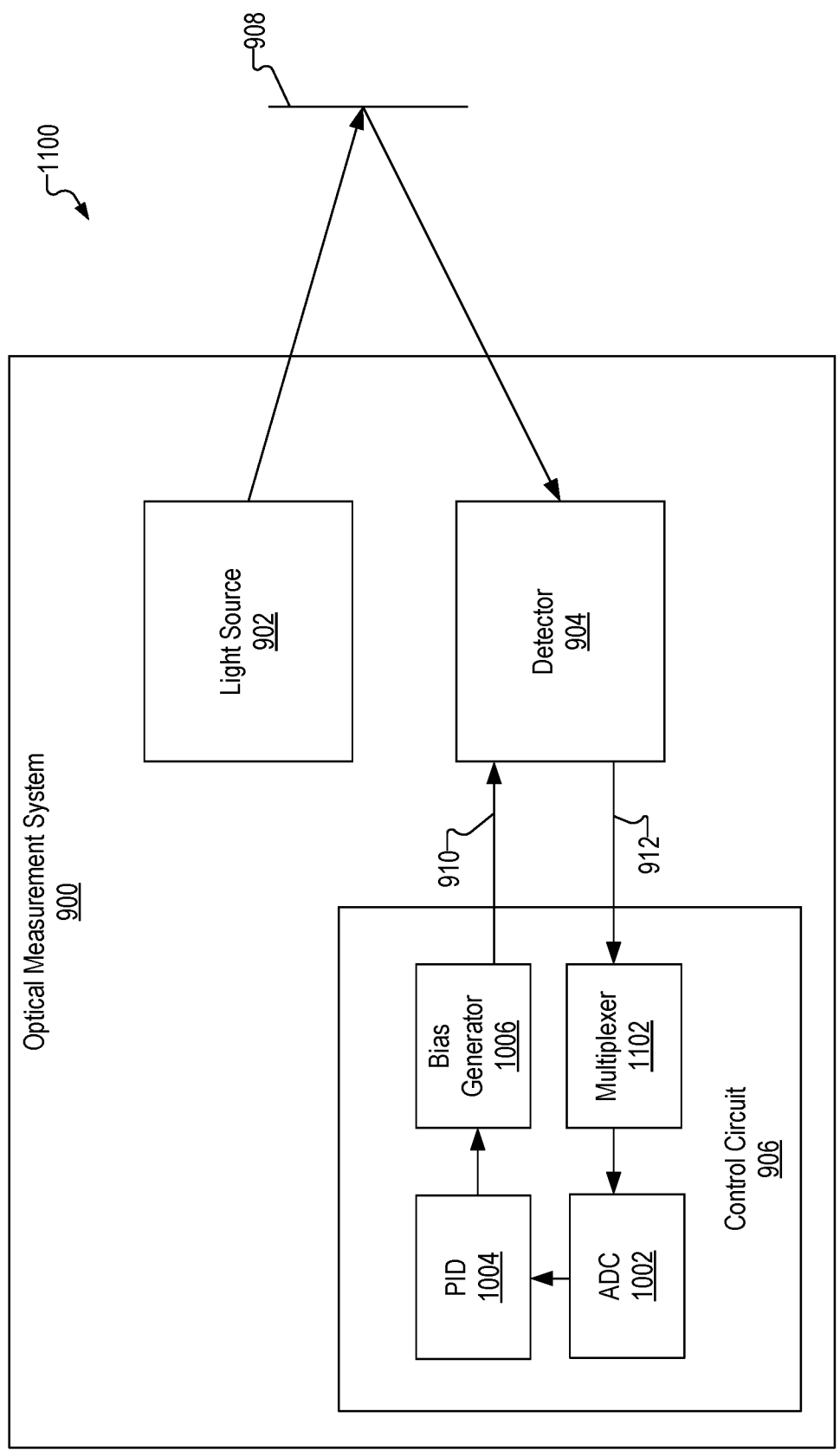

FIG. 11 illustrates another exemplary configuration 1100 of optical measurement system 900. Configuration 1100 may be similar to configuration 1000, except control circuit 906 further includes a multiplexer 1102.

Multiplexer 1102 may be implemented by any suitable circuit, controller, computing and/or processing device. Multiplexer 1102 may allow control circuit 906 to receive measured overvoltages 912 from a plurality of photodetectors of detector 904, such as an identified photodetector subset. The multiple inputs may be fed through multiplexer 1102 to ADC 1002. Consequently, control circuit 906 may update the value of bias voltage 910 based on an average of the measured overvoltages 912 or any other suitable combination or value based on the plurality of overvoltages 912 with one (or a few) ADC 1002.

Additionally or alternatively, control circuit 906 may update the value of bias voltage 910 based on a random overvoltage 912 of the plurality of overvoltages 912. Additionally or alternatively, control circuit 906 may update the value of bias voltage 910 based on an ordered selected overvoltage of the plurality of overvoltages 912. For example, the photodetectors of detector 904 may be ordered in any suitable manner. Control circuit 906 may measure overvoltages 912 based on the order of the photodetectors and may update values of bias voltage 910 based on overvoltage 912 of a respective next photodetector that has detected a photon.

Figure 12:
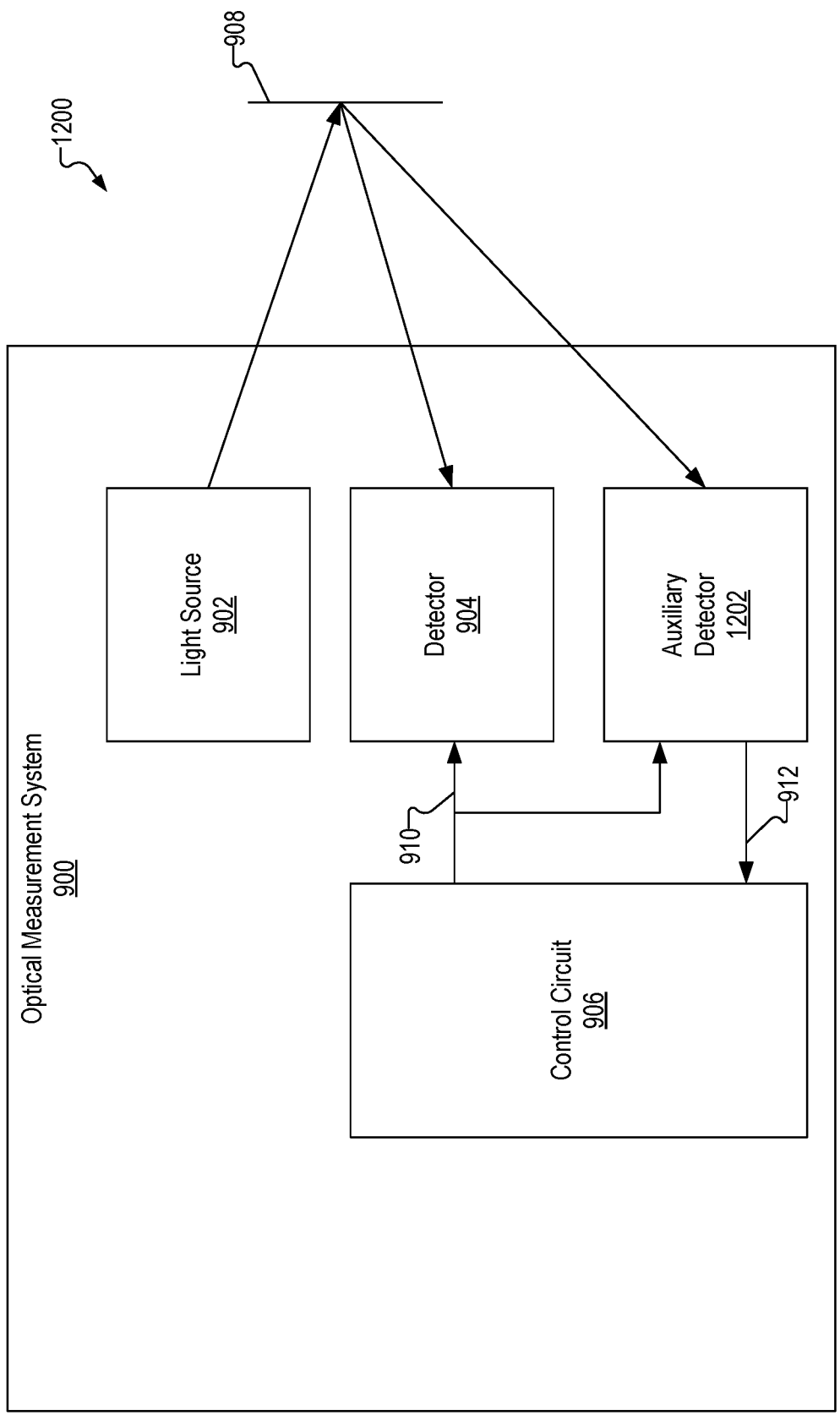

FIG. 12 illustrates another exemplary configuration 1200 of optical measurement system 900. Configuration 1200 may be similar to any of the configurations described herein, except configuration 1200 includes an auxiliary detector 1202. Auxiliary detector 1202 may be an additional detector separate from detector 904 dedicated for measuring overvoltage 912 so that control circuit 906 may update bias voltage 910. Auxiliary detector 1202 may receive a same bias voltage 910 and be positioned relatively proximate to detector 904 so that overvoltage 912 output by auxiliary detector 1202 may provide an accurate assessment of breakdown voltage changes for both auxiliary detector 1202 and detector 904.

Additionally or alternatively, a subset of photodetectors of detector 904 may be dedicated for providing measured overvoltages 912 for updating bias voltage 910. Such dedicated photodetectors (including photodetectors of auxiliary detector 1202) may abstain from outputting or being used in outputting arrival time information of photons for generating histogram data.

Figure 13:
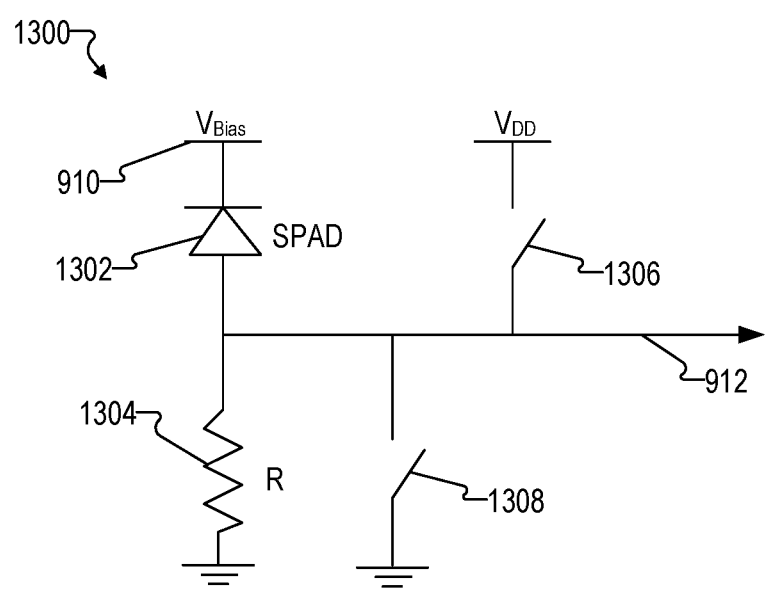
FIG. 13 shows an exemplary photodetector circuit.

FIG. 13 illustrates an exemplary photodetector circuit 1300, which may be an implementation of SPAD circuit 202 or a portion of SPAD circuit 202. Circuit 1300 includes a photodetector 1302 (e.g., a SPAD) configured to receive and operate in accordance with bias voltage 910.

Circuit 1300 further includes a resistor 1304 that is coupled to photodetector 1302. Resistor 1304 may have a resistance value that is configured to determine a duration of a deadtime of photodetector 1302. A larger value of resistor 1304 may allow overvoltage 912 to decay slower so that a control circuit (e.g., control circuit 906, ADC 1002) coupled to circuit 1300 may measure overvoltage 912 easily (e.g., without utilizing a sample and hold circuit). Additionally or alternatively, circuit 1300 may include a sample and hold circuit and/or an amplifier for outputting overvoltage 912.

Circuit 1300 may further include a disable switch 1306 and a reset switch 1308. Disable switch 1306 and reset switch 1308 may each be implemented using any suitable circuit and/or circuit component (e.g., any suitable transistor).

Disable switch 1306 may be configured to, when engaged, reduce a voltage across photodetector 1302 to below the bias voltage for photodetector 1302 so that photodetector 1302 may be disabled. For example, if a photodetector 1302 has a manufacturing defect and/or is otherwise malfunctioning, excessively noisy, or for any other suitable reason the output of photodetector 1302 is not useful, disable switch 1306 may be engaged to disable photodetector 1302.

Reset switch 1308 may be configured to arm photodetector 1302 before a measurement (e.g., before an emission of a light pulse, at a certain time after an emission of a light pulse, etc.).

Figure 14:
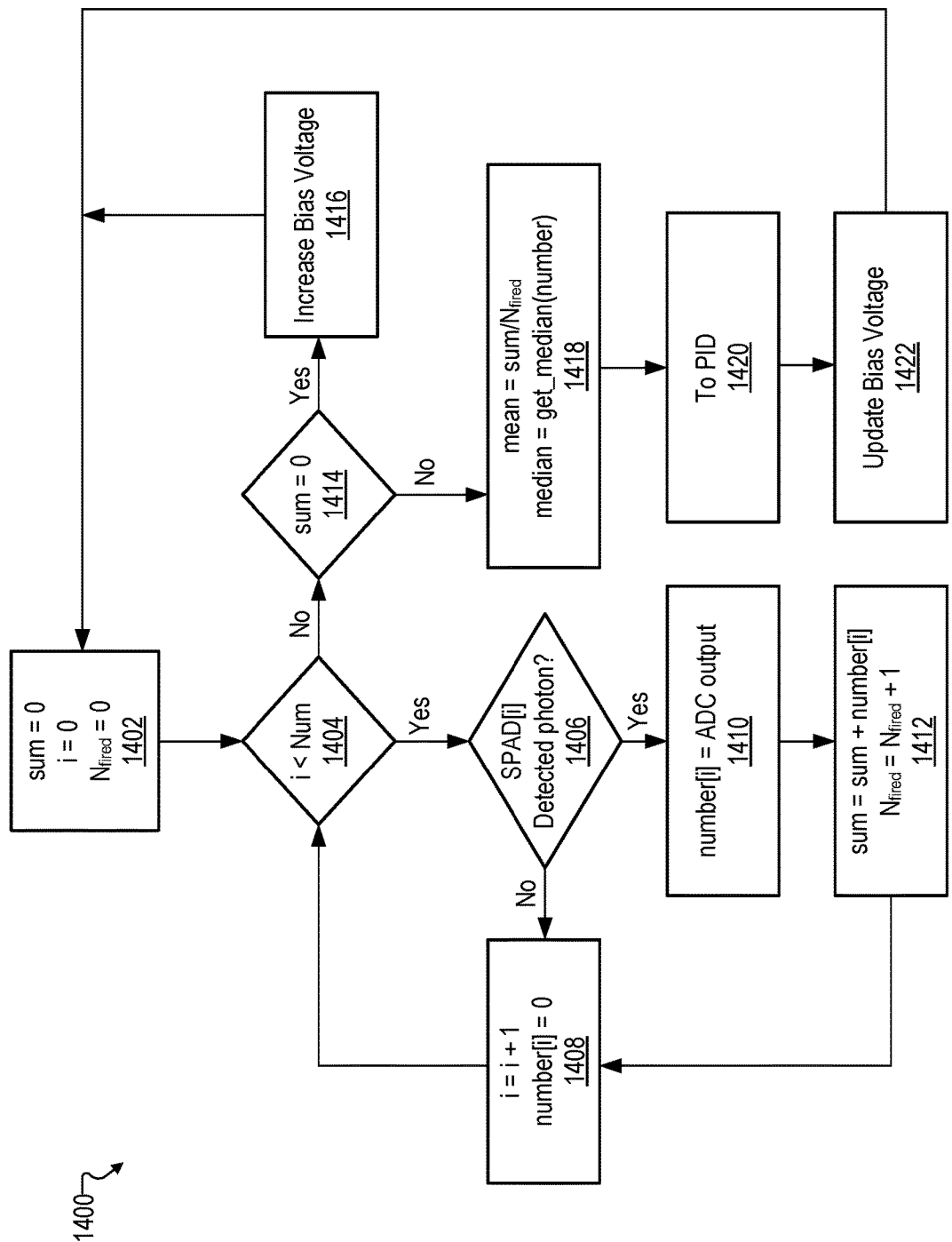
FIG. 14 shows an exemplary method.

FIG. 14 illustrates an exemplary method 1400 for identifying a photodetector subset and determining an overvoltage associated with the photodetector subset. Method 1400 may be performed by control circuit 906 and/or any implementation thereof. While FIG. 14 illustrates exemplary operations according to one embodiment, other embodiments may omit, add to, reorder, and/or modify any of the operations shown in FIG. 14. Each of the operations shown in FIG. 14 may be performed in any of the ways described herein.

At operation 1402, a control circuit (e.g., control circuit 906) may reset variables sum, i, and $N_{fired}$ to 0. Variable i may be used as a counter, $N_{fired}$ may be a number of photodetectors that have detected photons, and sum may be a total overvoltage measured for the photodetectors that have detected photons.

At operation 1404, control circuit 906 may iterate through a plurality of photodetectors of a detector (e.g., auxiliary detector 1202, detector 904, a subset of photodetectors in detector 904 dedicated to measuring overvoltages, etc.) being used to measure overvoltages. Control circuit 906 may compare the counter i to Num, which may be a total number of the photodetectors being used to measure overvoltages. If i is less than Num, control circuit 906 may perform operation 1406.

At operation 1406, control circuit 906 determines whether an $i^{th}$ photodetector (e.g., SPAD[i]) has detected a photon. Control circuit 906 may make such a determination in any suitable manner. For instance, the photodetector may output an indication when the photodetector detects a photon. Additionally or alternatively, the photodetector may include an indicator that indicates whether the photodetector has detected a photon. Additionally or alternatively, control circuit 906 may determine based on a voltage level of an output voltage of the photodetector whether the photodetector has detected a photon. If the photodetector has not detected a photon, control circuit 906 may perform operation 1408.

At operation 1408, control circuit 906 may increment counter i and set a variable number[i] to zero. The variable number[i] may represent the overvoltage of the $i^{th}$ photodetector, but may also be set to zero if the $i^{th}$ photodetector did not detect a photon. Thus, control circuit 906 may abstain from including photodetectors that do not detect photons in the determination of the overvoltage upon which the bias voltage is updated. Control circuit 906 may return to operation 1404 to iterate through a next photodetector.

If at operation 1406 control circuit 906 determines that the $i^{th}$ photodetector did detect a photon, control circuit 906 may perform operation 1410. At operation 1410, control circuit 906 may assign number[i] to equal the overvoltage (e.g., overvoltage 912) of the $i^{th}$ photodetector, for example, based on an output of an ADC (e.g., ADC 1002).

At operation 1412, control circuit 906 may add number[i] to sum, making sum a running total of overvoltages for the photodetectors that have detected photons. Control circuit 906 may also increment $N_{fired}$, keeping a count of how many photodetectors have detected photons. Control circuit 906 may then perform operation 1408 to move to the next photodetector.

Returning to operation 1404, once control circuit 906 has iterated through all the photodetectors, the counter i may no longer be less than Num, and control circuit 906 may move to operation 1414. At operation 1414, control circuit 906 may check whether variable sum equals zero. Variable sum equaling zero would indicate that none of the overvoltage values were added to sum, meaning none of the photodetectors detected a photon. In such a case, control circuit 906 may perform operation 1416.

At operation 1416, control circuit 906 may update a bias voltage (e.g., bias voltage 910) to increase a voltage level of bias voltage 910. Control circuit 906 may increase bias voltage 910 as having no photodetectors detect photons may indicate that the voltage level of bias voltage 910 is too low. Control circuit 906 may then return to operation 1402.

If at operation 1414, variable sum does not equal zero, control circuit 906 may perform operation 1418. At operation 1418, control circuit 906 may determine an overvoltage associated with the photodetectors that have detected photons. For example, control circuit 906 may determine an average overvoltage, such as a mean by dividing the variable sum by $N_{fired}$ and/or a median by determining a median across the array number.

At operation 1420, control circuit 906 may provide the overvoltage associated with the photodetectors that have detected photons to a PID (e.g., PID 1004).

At operation 1422, control circuit 906 may update bias voltage 910 to have a value based on the overvoltage associated with the photodetectors so that bias voltage 910 remains a predetermined overvoltage greater than a breakdown voltage of the photodetectors. For example, a bias generator (e.g., bias generator 1006) may generate bias voltage 910 with the updated value. Control circuit 906 may then return to operation 1402 to repeat the feedback loop to continue maintaining the bias voltage based on the measured overvoltage.

While operation 1418 is shown as a determining an average overvoltage based on the photodetectors that have detected photons, in some examples, control circuit 906 may update bias voltage 910 based on an overvoltage of a particular photodetector that has detected a photon. For example, operation 1410 may lead directly to operation 1420, so that control circuit 906 updates bias voltage 910 based on an overvoltage of the $i^{th}$ photodetector as control circuit 906 iterates through the photodetectors.

Figure 15:
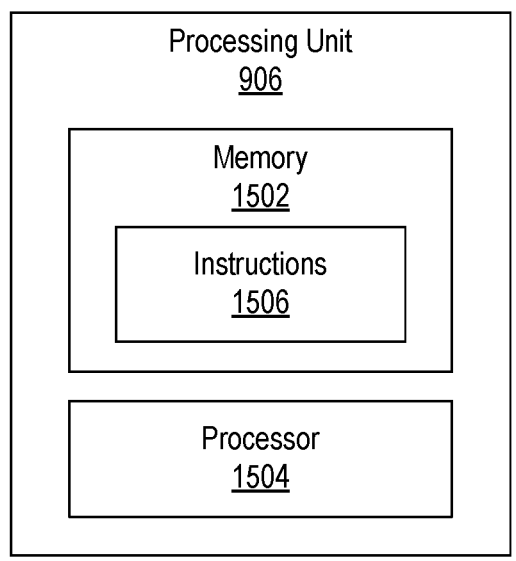
FIG. 15 illustrates an exemplary implementation of a processing unit.

FIG. 15 illustrates an exemplary implementation of a processing unit (e.g., processor 108) that includes a memory 1502 and a processor 1504 configured to be selectively and communicatively coupled to one another. In some examples, memory 1502 and processor 1504 may be distributed between multiple devices and/or multiple locations as may serve a particular implementation.

Memory 1502 may be implemented by any suitable non-transitory computer-readable medium and/or non-transitory processor-readable medium, such as any combination of non-volatile storage media and/or volatile storage media. Exemplary non-volatile storage media include, but are not limited to, read-only memory, flash memory, a solid-state drive, a magnetic storage device (e.g., a hard drive), ferroelectric random-access memory ("RAM"), and an optical disc. Exemplary volatile storage media include, but are not limited to, RAM (e.g., dynamic RAM).

Memory 1502 may maintain (e.g., store) executable data used by processor 1504 to perform one or more of the operations described herein. For example, memory 1502 may store instructions 1506 that may be executed by processor 1504 to perform any of the operations described herein. Instructions 1506 may be implemented by any suitable application, program (e.g., sound processing program), software, code, and/or other executable data instance. Memory 1502 may also maintain any data received, generated, managed, used, and/or transmitted by processor 1504.

Processor 1504 may be configured to perform (e.g., execute instructions 1506 stored in memory 1502 to perform) various operations described herein. For example, processor 1504 may be configured to perform any of the operations described herein as being performed by the processing unit.

In some examples, the processing unit may be included in the same wearable system (e.g., a head-mountable component) that includes a light source (e.g., light source 902) and a detector (e.g., detector 904). Alternatively, the processing unit is not included in the same wearable system that includes light source 902 and detector 904.

To illustrate, the processing unit may be included in a wearable device separate from a head-mountable component that includes light source 902 and detector 904. For example, the processing unit may be included in a wearable device configured to be worn off the head while the head-mountable component is worn on the head. In these examples, one or more communication interfaces (e.g., cables, wireless interfaces, etc.) may be used to facilitate communication between the head-mountable component and the separate wearable device.

Additionally or alternatively, the processing unit may be remote from the user (i.e., not worn by the user). For example, the processing unit may be implemented by a stand-alone computing device communicatively coupled the head-mountable component by way of one or more communication interfaces (e.g., cables, wireless interfaces, etc.).

FIGS. 16-21 illustrate embodiments of a wearable device 1600 that includes elements of the optical detection systems described herein. In particular, the wearable devices 1600 shown in FIGS. 16-21 include a plurality of modules 1602, similar to the modules described herein. For example, each module 1602 may include a light source (e.g., light source 704-1) and a plurality of detectors (e.g., detectors 706-1 through 706-6). The wearable devices 1600 may each also include a controller (e.g., controller 112) and a processor (e.g., processor 108) and/or be communicatively connected to a controller and processor. In general, wearable device 1600 may be implemented by any suitable headgear and/or clothing article configured to be worn by a user. The headgear and/or clothing article may include batteries, cables, and/or other peripherals for the components of the optical measurement systems described herein.

Figure 16:
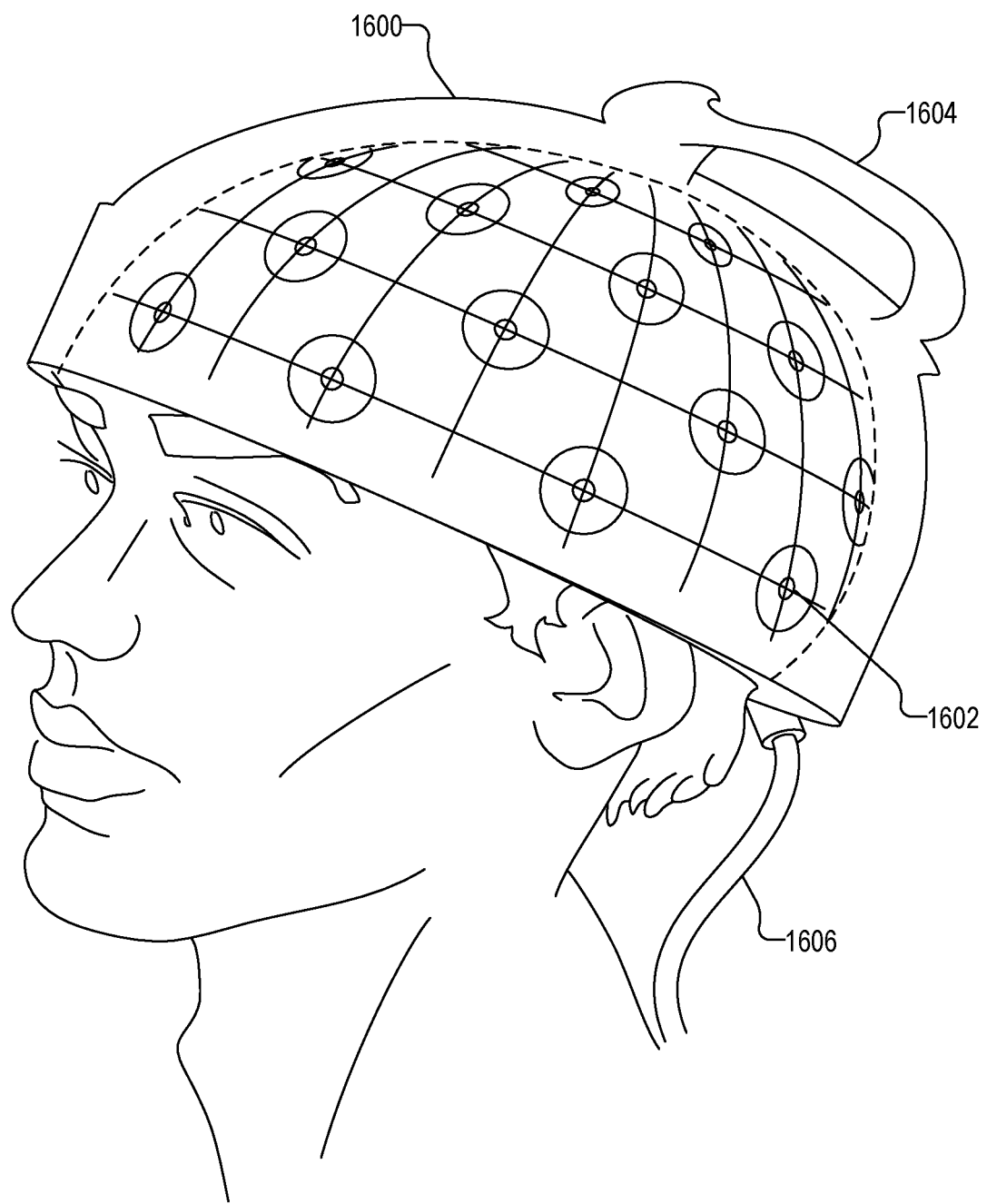
FIGS. 16-21 illustrate embodiments of a wearable device that includes elements of the optical detection systems described herein.
Figure 17:
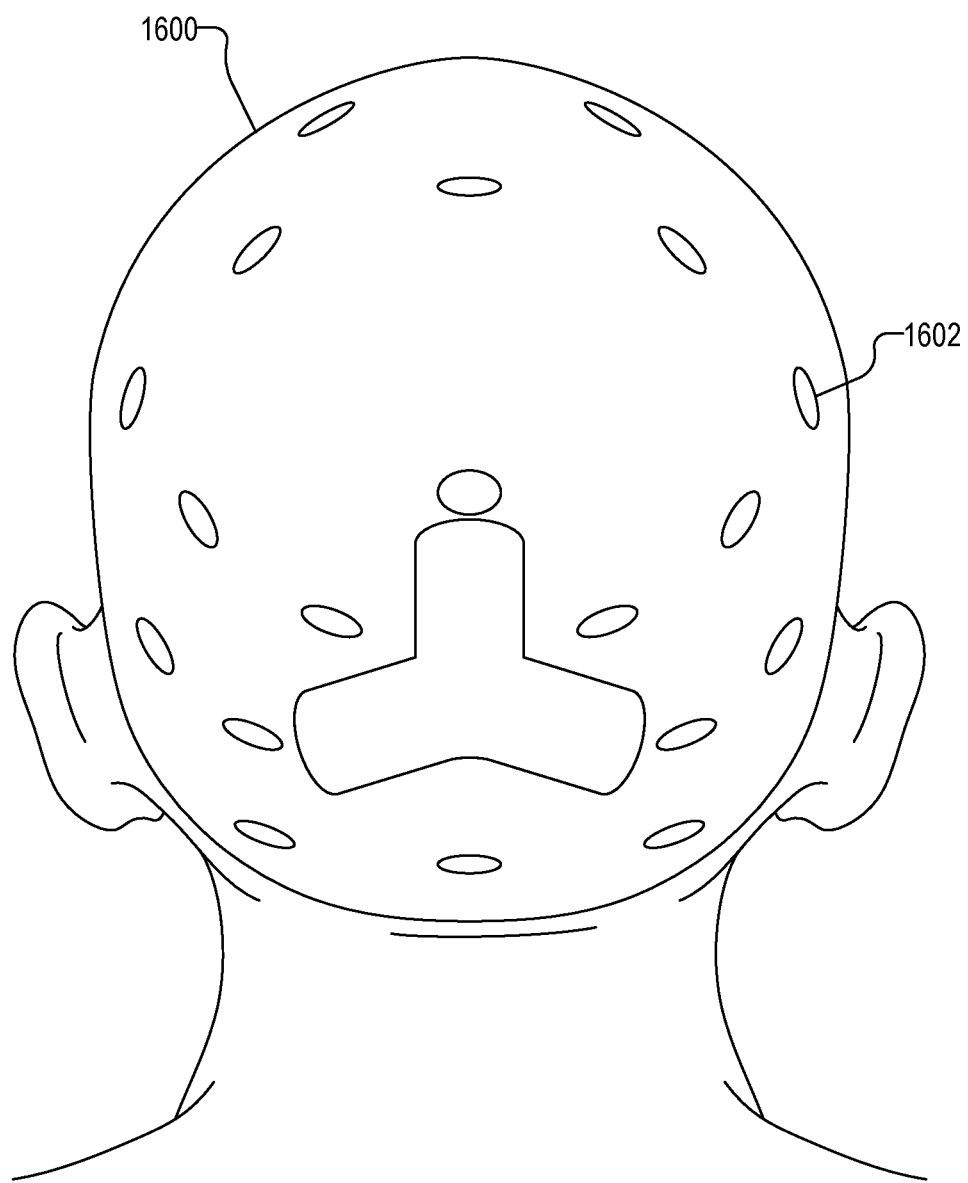
Figure 18:
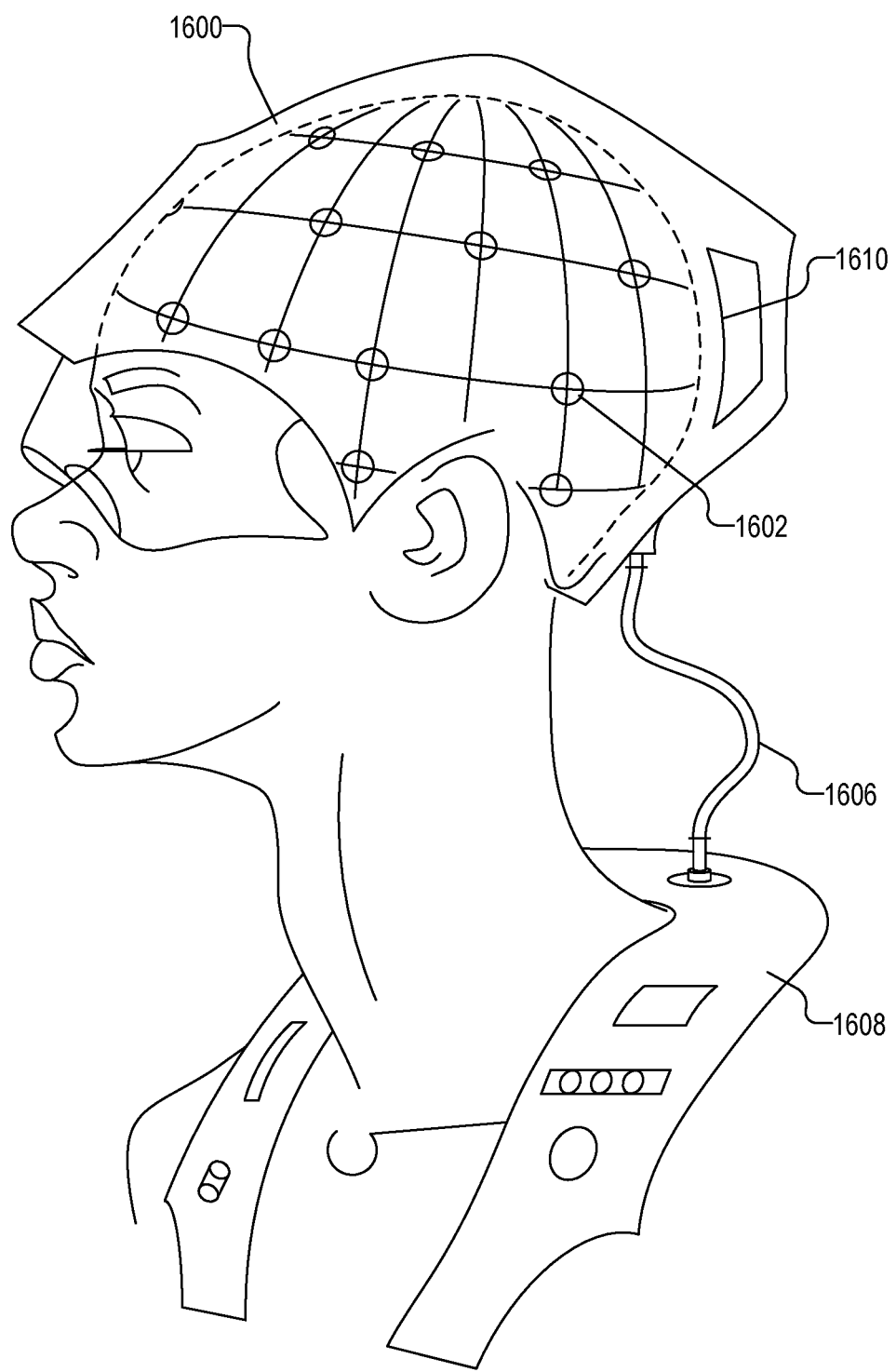

FIG. 16 illustrates an embodiment of a wearable device 1600 in the form of a helmet with a handle 1604. A cable 1606 extends from the wearable device 1600 for attachment to a battery or hub (with components such as a processor or the like). FIG. 17 illustrates another embodiment of a wearable device 1600 in the form of a helmet showing a back view. FIG. 18 illustrates a third embodiment of a wearable device 1600 in the form of a helmet with the cable 1606 leading to a wearable garment 1608 (such as a vest or partial vest) that can include a battery or a hub. Alternatively or additionally, the wearable device 1600 can include a crest 1610 or other protrusion for placement of the hub or battery.

Figure 19:
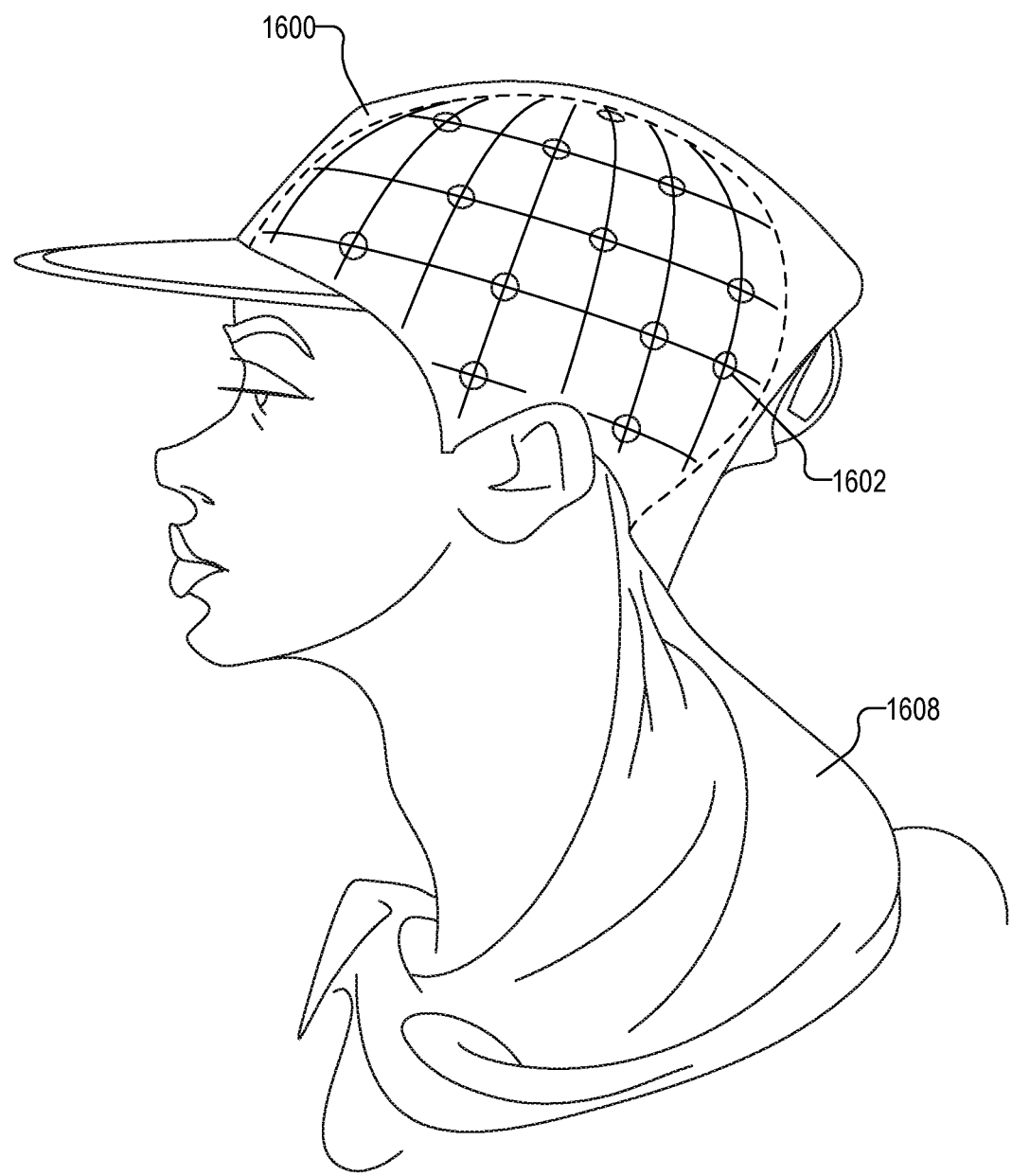
Figure 20:
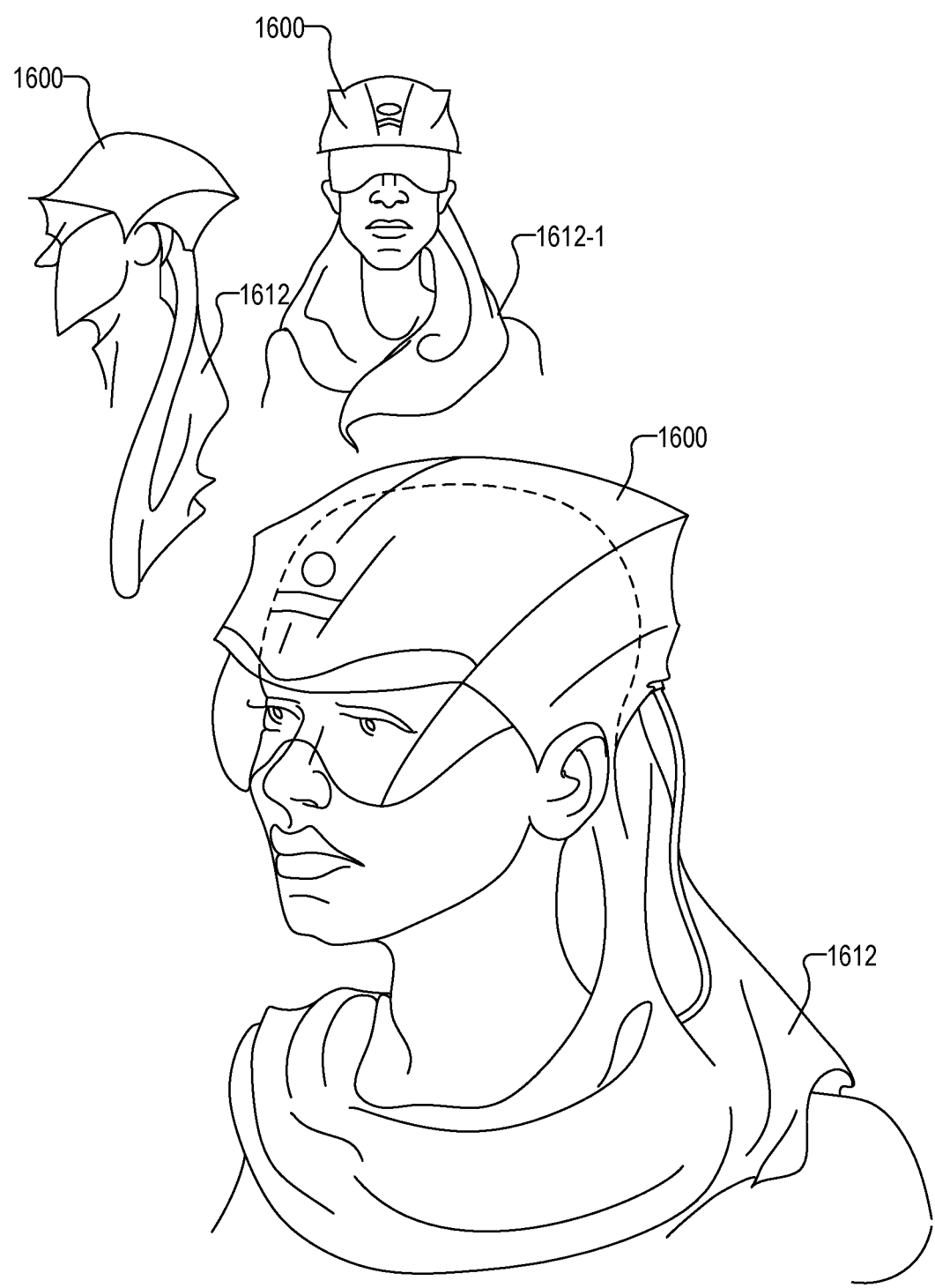
Figure 21:
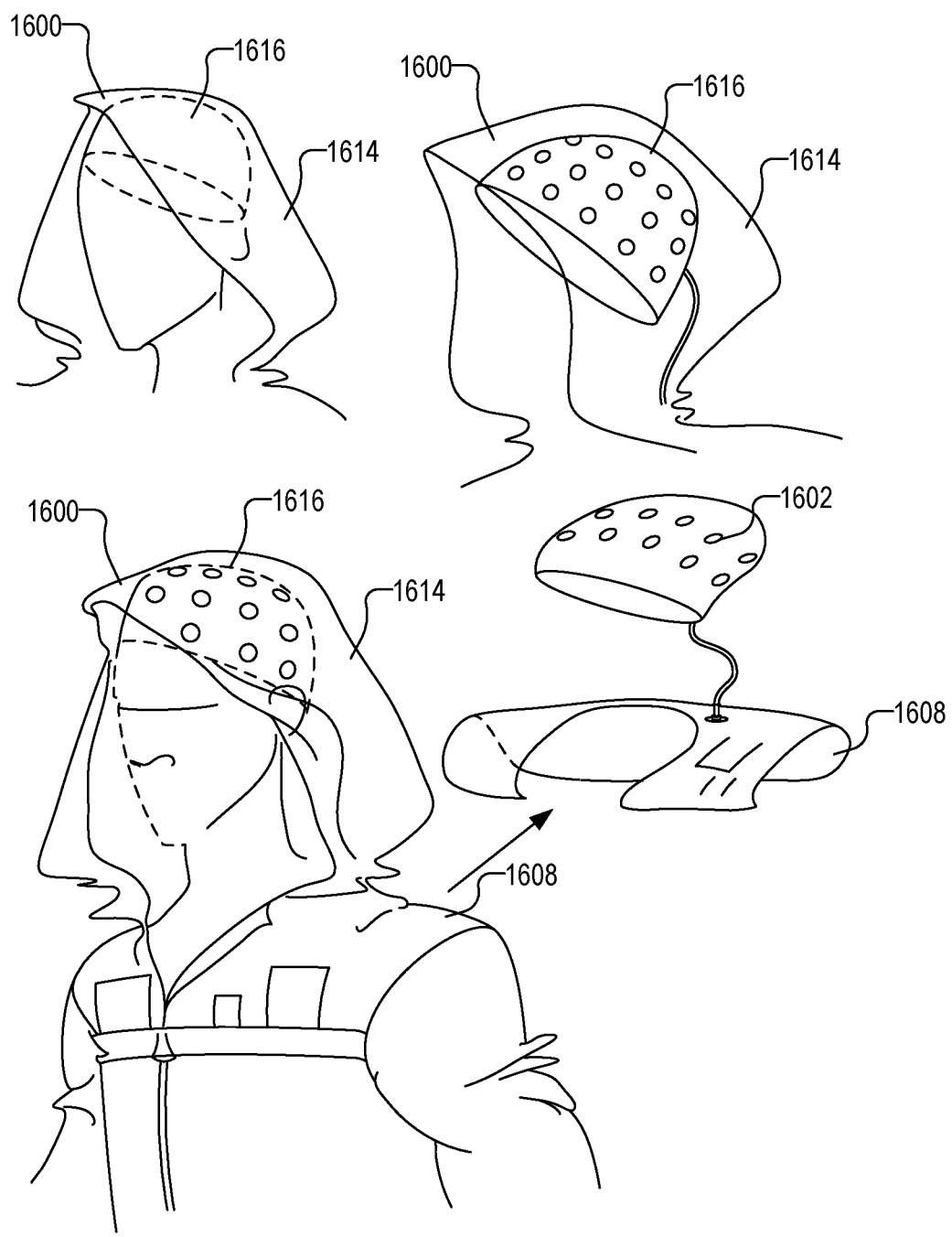

FIG. 19 illustrates another embodiment of a wearable device 1600 in the form of a cap with a wearable garment 1608 in the form of a scarf that may contain or conceal a cable, battery, and/or hub. FIG. 20 illustrates additional embodiments of a wearable device 1600 in the form of a helmet with a one-piece scarf 1612 or two-piece scarf 1612-1. FIG. 21 illustrates an embodiment of a wearable device 1600 that includes a hood 1614 and a beanie 1616 which contains the modules 1602, as well as a wearable garment 1608 that may contain a battery or hub.

Figure 22:
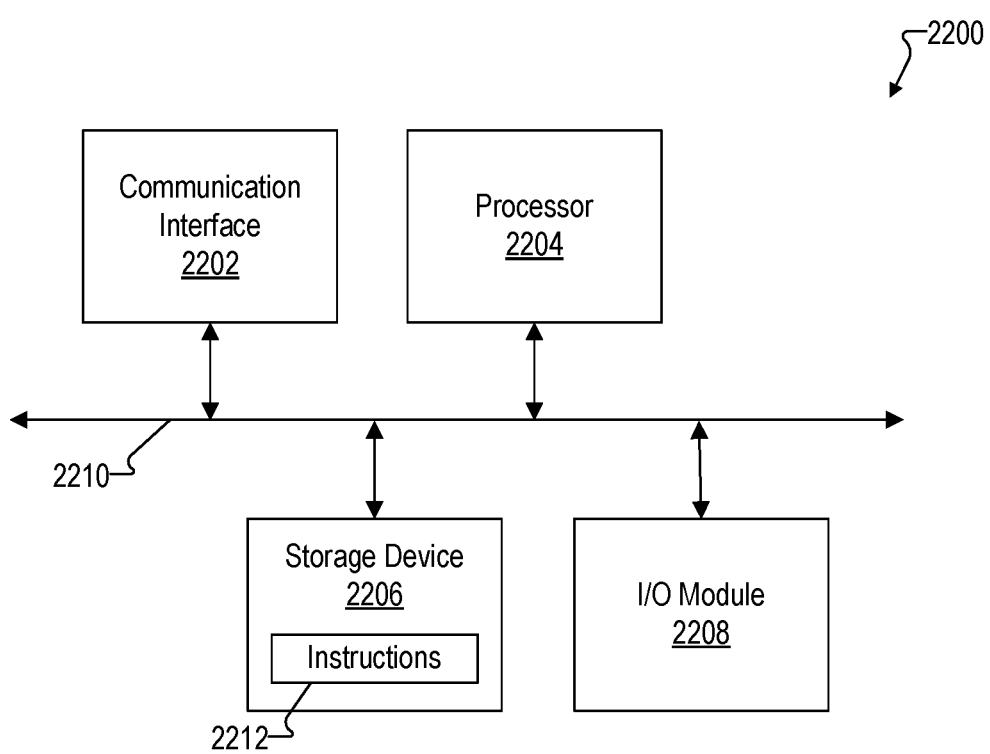
FIG. 22 illustrates an exemplary computing device.

FIG. 22 illustrates an exemplary computing device 2200 that may be specifically configured to perform one or more of the processes described herein. Any of the systems, units, computing devices, and/or other components described herein may be implemented by computing device 2200.

As shown in FIG. 22, computing device 2200 may include a communication interface 2202, a processor 2204, a storage device 2206, and an input/output ("I/O") module 2208 communicatively connected one to another via a communication infrastructure 2210. While an exemplary computing device 2200 is shown in FIG. 22, the components illustrated in FIG. 22 are not intended to be limiting. Additional or alternative components may be used in other embodiments. Components of computing device 2200 shown in FIG. 22 will now be described in additional detail.

Communication interface 2202 may be configured to communicate with one or more computing devices. Examples of communication interface 2202 include, without limitation, a wired network interface (such as a network interface card), a wireless network interface (such as a wireless network interface card), a modem, an audio/video connection, and any other suitable interface.

Processor 2204 generally represents any type or form of processing unit capable of processing data and/or interpreting, executing, and/or directing execution of one or more of the instructions, processes, and/or operations described herein. Processor 2204 may perform operations by executing computer-executable instructions 2212 (e.g., an application, software, code, and/or other executable data instance) stored in storage device 2206.

Storage device 2206 may include one or more data storage media, devices, or configurations and may employ any type, form, and combination of data storage media and/or device as described herein. Electronic data, including data described herein, may be temporarily and/or permanently stored in storage device 2206. For example, data representative of computer-executable instructions 2212 configured to direct processor 2204 to perform any of the operations described herein may be stored within storage device 2206. In some examples, data may be arranged in one or more databases residing within storage device 2206.

I/O module 2208 may include one or more I/O modules configured to receive user input and provide user output. I/O module 2208 may include any hardware, firmware, software, or combination thereof supportive of input and output capabilities. For example, I/O module 2208 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 2208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 2208 is configured to provide graphical data to a display for presentation to a user. The graphical data may be representative of one or more graphical user interfaces and/or any other graphical content as may serve a particular implementation.

Figure 23:
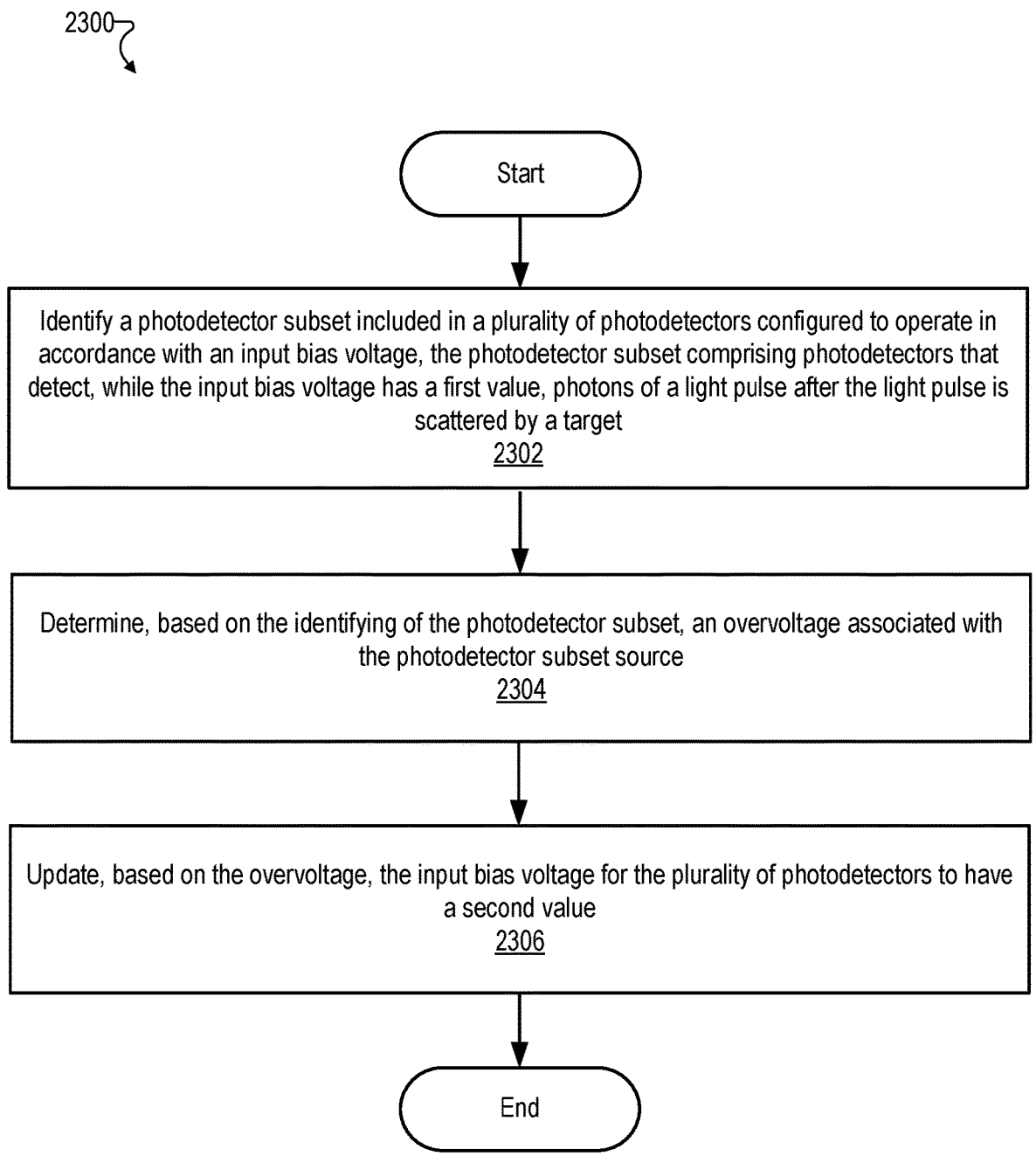
FIG. 23 illustrates an exemplary method.

FIG. 23 illustrates an exemplary method 2300 that may be performed by control circuit 906 and/or any implementation thereof. While FIG. 23 illustrates exemplary operations according to one embodiment, other embodiments may omit, add to, reorder, and/or modify any of the operations shown in FIG. 23. Each of the operations shown in FIG. 23 may be performed in any of the ways described herein.

At operation 2302, a control circuit identifies a photodetector subset included in a plurality of photodetectors configured to operate in accordance with an input bias voltage, the photodetector subset comprising photodetectors that detect, while the input bias voltage has a first value, photons of a light pulse after the light pulse is scattered by a target.

At operation 2304, the control circuit determines, based on the identifying of the photodetector subset, an overvoltage associated with the photodetector subset.

At operation 2306, the control circuit updates, based on the overvoltage, the input bias voltage for the plurality of photodetectors to have a second value.

An illustrative optical measurement system includes a light source configured to emit a light pulse directed at a target. The optical measurement system further includes a plurality of photodetectors configured to operate in accordance with an input bias voltage. The optical measurement system further includes a control circuit configured to identify a photodetector subset included in the plurality of photodetectors and that detects, while the input bias voltage has a first value, photons of the light pulse after the light pulse is scattered by the target. The control circuit is further configured to determine, based on the identifying of the photodetector subset, an overvoltage associated with the photodetector subset. The control circuit is further configured to update, based on the overvoltage, the input bias voltage for the plurality of photodetectors to have a second value.

An illustrative wearable system for use by a user includes a component configured to be attached to a body of the user. The component comprises a light source configured to emit a light pulse directed at a target within the body, and a plurality of photodetectors configured to detect photons of light after the light pulse is scattered by the target. The system further comprises a control circuit configured to identify a photodetector subset included in the plurality of photodetectors and that detects, while the input bias voltage has a first value, photons of the light pulse after the light pulse is scattered by the target. The control circuit is further configured to determine, based on the identifying of the photodetector subset, an overvoltage associated with the photodetector subset. The control circuit is further configured to update, based on the overvoltage, the input bias voltage for the plurality of photodetectors to have a second value.

An illustrative method includes identifying, by a control circuit, a photodetector subset included in a plurality of photodetectors configured to operate in accordance with an input bias voltage, the photodetector subset comprising photodetectors that detect, while the input bias voltage has a first value, photons of a light pulse after the light pulse is scattered by a target. The method further comprises determining, by the control circuit, based on the identifying of the photodetector subset, an overvoltage associated with the photodetector subset. The method further comprises updating, by the control circuit, based on the overvoltage, the input bias voltage for the plurality of photodetectors to have a second value.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. An optical measurement system comprising:
    a light source configured to emit a light pulse directed at a target;
    a plurality of photodetectors configured to operate in accordance with an input bias voltage; and
    a control circuit configured to:
        identify a photodetector subset included in the plurality of photodetectors and that detects, while the input bias voltage has a first value, photons of the light pulse after the light pulse is scattered by the target;
        determine, based on the identifying of the photodetector subset, an overvoltage associated with the photodetector subset, the determining the overvoltage comprising measuring a respective overvoltage for each photodetector of the photodetector subset; and
        update, based on the overvoltage, the input bias voltage for the plurality of photodetectors to have a second value.

2. The optical measurement system of claim 1, wherein the determining the overvoltage further comprises abstaining from determining the overvoltage based on an additional photodetector subset included in the plurality of photodetectors and that does not detect photons of the light pulse after the light pulse is scattered by the target.

3. The optical measurement system of claim 1, wherein:
    the light source is further configured to emit, subsequent to emitting the light pulse, an additional light pulse directed at the target; and
    the control circuit is further configured to:
        identify an additional photodetector subset included in the plurality of photodetectors and that detects, while the input bias voltage has the second value, photons of the additional light pulse after the additional light pulse is scattered by the target;
        determine, based on the identified additional photodetector subset, an additional overvoltage associated with the additional photodetector subset; and
        update, based on the additional overvoltage, the input bias voltage for the plurality of photodetectors to have a third value.

4. The optical measurement system of claim 1, wherein the determining the overvoltage associated with the photodetector subset further comprises
    determining an average overvoltage based on the respective overvoltage for each photodetector of the photodetector subset.

5. The optical measurement system of claim 1, wherein the control circuit comprises an analog-to-digital converter (ADC) configured to measure the overvoltage.

6. The optical measurement system of claim 5, wherein:
    the control circuit further comprises a proportional-integral-derivative (PID) controller; and
    the updating the input bias voltage comprises setting, using the PID controller, the second value at a value that compensates for a difference between the overvoltage associated with the photodetector subset and a predetermined overvoltage.

7. The optical measurement system of claim 1, further comprising:
    a first detector comprising the plurality of photodetectors;
    a second detector comprising an additional plurality of photodetectors, the second detector configured to detect arrival times for additional photons of the light pulse after the light pulse is scattered by the target; and a processing unit configured to generate, based on the arrival times, histogram data associated with the target.

8. The optical measurement system of claim 1, wherein the updating the input bias voltage comprises setting the second value to be greater than the first value if the subset of the plurality of photodetectors includes no photodetectors.

9. The optical measurement system of claim 1, wherein each photodetector of the plurality of photodetectors comprises a single photon avalanche diode (SPAD).

10. The optical measurement system of claim 1, further comprising a wearable assembly configured to be worn by a user, the wearable assembly configured to house the light source, the plurality of photodetectors, and the control circuit.

11. The optical measurement system of claim 10, wherein:
the wearable assembly is configured to be worn on a head of the user; and
the target comprises a brain of the user.

12. A wearable system for use by a user comprising:
a component configured to be attached to a body of the user, the component comprising:
    a light source configured to emit a light pulse directed at a target within the body, and
    a plurality of photodetectors configured to operate in accordance with an input bias voltage; and
a control circuit configured to:
    identify a photodetector subset included in the plurality of photodetectors and that detects, while the input bias voltage has a first value, photons of the light pulse after the light pulse is scattered by the target;
    determine, based on the identifying of the photodetector subset, an overvoltage associated with the photodetector subset, the determining the overvoltage comprising measuring a respective overvoltage for each photodetector of the photodetector subset; and
    update, based on the overvoltage, the input bias voltage for the plurality of photodetectors to have a second value.

13. The wearable system of claim 12, wherein the determining the overvoltage further comprises abstaining from determining the overvoltage based on an additional photodetector subset included in the plurality of photodetectors and that does not detect photons of the light pulse after the light pulse is scattered by the target.

14. The wearable system of claim 12, wherein:
the light source is further configured to emit, subsequent to emitting the light pulse, an additional light pulse directed at the target; and
the control circuit is further configured to:
    identify an additional photodetector subset included in the plurality of photodetectors and that detects, while the input bias voltage has the second value, photons of the additional light pulse after the additional light pulse is scattered by the target;
    determine, based on the identified additional photodetector subset, an additional overvoltage associated with the additional photodetector subset; and
    update, based on the additional overvoltage, the input bias voltage for the plurality of photodetectors to have a third value.

15. The wearable system of claim 12, wherein the determining the overvoltage associated with the photodetector subset further comprises
determining an average overvoltage based on the respective overvoltage for each photodetector of the photodetector subset.

16. The wearable system of claim 12, wherein the control circuit comprises an analog-to-digital converter (ADC) configured to measure the overvoltage.

17. The wearable system of claim 16, wherein:
the control circuit further comprises a proportional-integral-derivative (PID) controller; and
the updating the input bias voltage comprises setting, using the PID controller, the second value at a value that compensates for a difference between the overvoltage associated with the photodetector subset and a predetermined overvoltage.

18. A method comprising:
identifying, by a control circuit, a photodetector subset included in a plurality of photodetectors configured to operate in accordance with an input bias voltage, the photodetector subset comprising photodetectors that detect, while the input bias voltage has a first value, photons of a light pulse after the light pulse is scattered by a target;
determining, by the control circuit, based on the identifying of the photodetector subset, an overvoltage associated with the photodetector subset, the determining the overvoltage comprising measuring a respective overvoltage for each photodetector of the photodetector subset; and
updating, by the control circuit, based on the overvoltage, the input bias voltage for the plurality of photodetectors to have a second value.

* * * * *